United States Patent
Browne, Jr. et al.

(10) Patent No.: US 10,516,546 B2
(45) Date of Patent: Dec. 24, 2019

(54) LOAD CONTROL DEVICE USER INTERFACE AND DATABASE MANAGEMENT USING NEAR FIELD COMMUNICATION (NFC)

(71) Applicant: Lutron Technology Company LLC, Coopersburg, PA (US)

(72) Inventors: John C. Browne, Jr., Bethlehem, PA (US); Sean Henley, Emmaus, PA (US); Ratan Dominic Rego, Center Valley, PA (US); William Bryce Fricke, Bethlehem, PA (US); Robert D. Stevens, Emmaus, Jr., PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/194,693

(22) Filed: Nov. 19, 2018

(65) Prior Publication Data

US 2019/0089551 A1 Mar. 21, 2019

Related U.S. Application Data

(63) Continuation of application No. 13/837,575, filed on Mar. 15, 2013, now Pat. No. 10,135,629.

(51) Int. Cl.
 *H04L 12/28* (2006.01)
 *H05B 37/02* (2006.01)
 (Continued)

(52) U.S. Cl.
 CPC .......... *H04L 12/2807* (2013.01); *H04L 67/12* (2013.01); *H04W 4/70* (2018.02);
 (Continued)

(58) Field of Classification Search
 None
 See application file for complete search history.

(56) References Cited

U.S. PATENT DOCUMENTS

| 4,864,588 A | 9/1989 | Simpson et al. |
| 4,932,037 A | 6/1990 | Simpson et al. |
| (Continued) | | |

FOREIGN PATENT DOCUMENTS

| CA | 2892464 A1 | 11/2015 |
| CN | 101789978 A | 7/2010 |
| (Continued) | | |

OTHER PUBLICATIONS

"CEDIA 2012: Crestron Demos Home Technology Control Solution with NFC-Enabled Mobile Device" Available at http://www.youtube.com/watch?v=qXwoTJX14BE retrieved on Aug. 13, 2013 Video Provided on CD Media Sep. 8, 2012 pp. 1-2.
(Continued)

*Primary Examiner* — Jennifer L Norton
(74) *Attorney, Agent, or Firm* — Amy Yanek; Glen Farbanish; Philip Smith

(57) ABSTRACT

An energy control network may include a number of load control devices, such as dimmer switches, multi-button selector switch, occupancy sensors, and remote controllers, among others. These load control devices may be configured for wireless communication. Other wireless devices, such as laptops, tablets, and "smart" cellular phones may be configured to communicate with the load control devices of the energy control network. The load control devices and the other wireless communication devices may also be configured for Near Field Communication (NFC). NFC may be used to provide a load control device with its initial default configuration and/or an application specific configuration. Also, NFC may be used to transfer a configuration from one load control device that may have become faulty, to a
(Continued)

replacement load control device. And NFC may be used to provide and trigger commands that may cause a load control load device to operate in a predetermined manner.

12 Claims, 22 Drawing Sheets

(51) Int. Cl.
  *H04L 29/08* (2006.01)
  *H04W 4/70* (2018.01)
  *H04W 4/80* (2018.01)
(52) U.S. Cl.
  CPC ..... *H05B 37/0245* (2013.01); *H05B 37/0272* (2013.01); *G05B 2219/23161* (2013.01); *G05B 2219/25187* (2013.01); *G05B 2219/25192* (2013.01); *H04L 2012/285* (2013.01); *H04L 2012/2841* (2013.01); *H04W 4/80* (2018.02); *Y02B 20/48* (2013.01)

(56) References Cited

U.S. PATENT DOCUMENTS

| | | | |
|---|---|---|---|
| 4,995,053 A | 2/1991 | Simpson et al. |
| 5,239,205 A | 8/1993 | Hoffman et al. |
| 5,340,954 A | 8/1994 | Hoffman et al. |
| 5,454,077 A | 9/1995 | Cheron |
| 5,488,571 A | 1/1996 | Jacobs et al. |
| 5,519,704 A | 5/1996 | Farinacci et al. |
| 5,627,863 A | 5/1997 | Aslanis et al. |
| 5,637,930 A | 6/1997 | Rowen et al. |
| 5,637,964 A | 6/1997 | Hakkarainen et al. |
| 5,736,965 A | 4/1998 | Mosebrook et al. |
| 5,812,819 A | 9/1998 | Rodwin et al. |
| 5,818,128 A | 10/1998 | Hoffman et al. |
| 5,838,226 A | 11/1998 | Houggy et al. |
| 5,848,054 A | 12/1998 | Mosebrook et al. |
| 5,905,442 A | 5/1999 | Mosebrook et al. |
| 5,982,103 A | 11/1999 | Mosebrook et al. |
| 6,167,464 A | 12/2000 | Kretschmann |
| 6,169,377 B1 | 1/2001 | Byrde et al. |
| 6,300,727 B1 | 10/2001 | Bryde et al. |
| 6,324,089 B1 | 11/2001 | Symoen et al. |
| 6,380,696 B1 | 4/2002 | Sembhi et al. |
| 6,437,692 B1 | 8/2002 | Petite et al. |
| 6,526,581 B1 | 2/2003 | Edson |
| 6,545,434 B2 | 4/2003 | Sembhi et al. |
| 6,687,487 B1 | 2/2004 | Mosebrook et al. |
| 6,803,728 B2 | 10/2004 | Gnanagiri et al. |
| 6,807,463 B1 | 10/2004 | Cunningham et al. |
| 6,831,569 B2 | 12/2004 | Wang et al. |
| 6,856,236 B2 | 2/2005 | Christensen et al. |
| 6,859,644 B2 | 2/2005 | Wang |
| 6,876,295 B1 | 4/2005 | Lewis |
| 6,879,806 B2 | 4/2005 | Shorty |
| 6,891,838 B1 | 5/2005 | Petite et al. |
| 6,903,650 B2 | 6/2005 | Murray |
| 6,914,533 B2 | 7/2005 | Petite |
| 6,914,893 B2 | 7/2005 | Petite |
| 6,927,547 B2 | 8/2005 | Walko et al. |
| 6,980,080 B2 | 12/2005 | Christensen et al. |
| 7,035,270 B2 | 4/2006 | Moore, Jr. et al. |
| 7,053,767 B2 | 5/2006 | Petite et al. |
| 7,085,627 B2 | 8/2006 | Bamberger et al. |
| 7,089,066 B2 | 8/2006 | Hesse et al. |
| 7,102,502 B2 | 9/2006 | Autret |
| 7,103,511 B2 | 9/2006 | Petite |
| 7,106,261 B2 | 9/2006 | Nagel et al. |
| 7,126,291 B2 | 10/2006 | Kruse et al. |
| 7,211,968 B2 | 5/2007 | Adamson et al. |
| 7,218,998 B1 | 5/2007 | Neale |
| 7,219,141 B2 | 5/2007 | Bonasia et al. |
| 7,307,542 B1 | 12/2007 | Chandler et al. |
| 7,323,991 B1 | 1/2008 | Eckert et al. |
| 7,345,270 B1 | 3/2008 | Jones et al. |
| 7,346,016 B2 | 3/2008 | Nielsen et al. |
| 7,358,927 B2 | 4/2008 | Luebke et al. |
| 7,362,285 B2 | 4/2008 | Webb et al. |
| 7,408,525 B2 | 8/2008 | Webb et al. |
| 7,498,952 B2 * | 3/2009 | Newman, Jr. .......... H01Q 7/005 307/139 |
| 7,525,928 B2 | 4/2009 | Cutler |
| 7,548,216 B2 | 6/2009 | Webb et al. |
| 7,573,208 B2 | 8/2009 | Newman, Jr. |
| 7,573,436 B2 | 8/2009 | Webb et al. |
| 7,598,684 B2 | 10/2009 | Lys et al. |
| 7,687,744 B2 | 3/2010 | Walter et al. |
| 7,697,492 B2 | 4/2010 | Petite |
| 7,714,790 B1 | 5/2010 | Feldstein et al. |
| 7,755,505 B2 | 7/2010 | Johnson et al. |
| 7,756,086 B2 | 7/2010 | Petite et al. |
| 7,756,097 B2 | 7/2010 | Uehara et al. |
| 7,756,556 B2 | 7/2010 | Patel et al. |
| 7,805,134 B2 | 9/2010 | Mirza-Baig |
| 7,821,160 B1 | 10/2010 | Roosli et al. |
| 7,852,765 B2 | 12/2010 | Neuman et al. |
| 7,853,221 B2 | 12/2010 | Rodriguez et al. |
| 7,889,051 B1 | 2/2011 | Billig et al. |
| 8,013,732 B2 | 9/2011 | Petite et al. |
| 8,031,650 B2 | 10/2011 | Petite et al. |
| 8,035,255 B2 | 10/2011 | Kurs et al. |
| 8,146,074 B2 | 3/2012 | Ito et al. |
| 8,173,920 B2 | 5/2012 | Altonen et al. |
| 8,228,163 B2 | 7/2012 | Cash et al. |
| 8,254,838 B2 | 8/2012 | Feldstein |
| 8,339,247 B2 | 12/2012 | Adamson et al. |
| 8,364,319 B2 | 1/2013 | Roosli |
| 8,368,310 B1 | 2/2013 | Roosli |
| 8,379,564 B2 | 2/2013 | Petite et al. |
| 8,396,007 B2 | 3/2013 | Gonia et al. |
| 8,416,074 B2 | 4/2013 | Sadwick |
| 8,525,372 B2 | 9/2013 | Huang |
| 8,548,607 B1 | 10/2013 | Belz et al. |
| 8,598,978 B2 | 12/2013 | Knode |
| 8,742,686 B2 | 6/2014 | Zampini, II et al. |
| 8,792,401 B2 | 7/2014 | Banks et al. |
| 8,892,261 B2 | 11/2014 | Hoonhout et al. |
| 9,066,381 B2 | 6/2015 | Valois et al. |
| 9,288,228 B2 | 3/2016 | Suumaki |
| 9,445,482 B2 | 9/2016 | Brochu et al. |
| 9,445,485 B2 | 9/2016 | Reed |
| 9,548,797 B1 * | 1/2017 | Green .................. H04B 5/0031 |
| 9,641,959 B2 | 5/2017 | Brochu et al. |
| 9,766,645 B2 | 9/2017 | Imes et al. |
| 9,767,249 B1 | 9/2017 | Belz et al. |
| 2001/0024164 A1 | 9/2001 | Kawamura et al. |
| 2002/0043938 A1 | 4/2002 | Lys |
| 2002/0060530 A1 | 5/2002 | Sembhi et al. |
| 2002/0073183 A1 | 6/2002 | Yoon et al. |
| 2002/0087436 A1 | 7/2002 | Guthrie et al. |
| 2002/0113909 A1 | 8/2002 | Sherwood |
| 2002/0154025 A1 | 10/2002 | Ling |
| 2003/0034898 A1 | 2/2003 | Shamoon et al. |
| 2003/0040813 A1 | 2/2003 | Gonzales et al. |
| 2003/0109270 A1 | 6/2003 | Shorty |
| 2003/0151493 A1 | 8/2003 | Straumann et al. |
| 2003/0197993 A1 | 10/2003 | Mirowski et al. |
| 2004/0036624 A1 | 2/2004 | Ballew et al. |
| 2004/0052076 A1 | 3/2004 | Mueller et al. |
| 2004/0058706 A1 | 3/2004 | Williamson et al. |
| 2004/0059840 A1 | 3/2004 | Perego et al. |
| 2004/0193998 A1 | 9/2004 | Blackburn et al. |
| 2004/0217718 A1 | 11/2004 | Kumar et al. |
| 2005/0030153 A1 | 2/2005 | Mullet et al. |
| 2005/0045429 A1 | 3/2005 | Baker |
| 2005/0048944 A1 | 3/2005 | Wu |
| 2005/0156708 A1 | 7/2005 | Puranik et al. |
| 2005/0253538 A1 | 11/2005 | Shah et al. |
| 2005/0285547 A1 | 12/2005 | Piepgras et al. |
| 2006/0027081 A1 | 2/2006 | Chang et al. |
| 2006/0044152 A1 | 3/2006 | Wang |
| 2006/0109203 A1 | 5/2006 | Huber et al. |
| 2006/0154598 A1 | 7/2006 | Rudland et al. |

(56) References Cited

U.S. PATENT DOCUMENTS

| | | |
|---|---|---|
| 2006/0171332 A1 | 8/2006 | Barnum |
| 2006/0174102 A1 | 8/2006 | Smith et al. |
| 2006/0192697 A1 | 8/2006 | Quick et al. |
| 2006/0202851 A1 | 9/2006 | Cash et al. |
| 2006/0251059 A1 | 11/2006 | Otsu et al. |
| 2006/0256798 A1 | 11/2006 | Quick et al. |
| 2006/0273970 A1 | 12/2006 | Mosebrook et al. |
| 2006/0284734 A1 | 12/2006 | Newman, Jr. |
| 2006/0285150 A1 | 12/2006 | Jung et al. |
| 2007/0051529 A1 | 3/2007 | Soccoli et al. |
| 2007/0083294 A1 | 4/2007 | Bruno |
| 2007/0085699 A1 | 4/2007 | Walters et al. |
| 2007/0085700 A1 | 4/2007 | Walters et al. |
| 2007/0085701 A1 | 4/2007 | Walters et al. |
| 2007/0085702 A1 | 4/2007 | Walters et al. |
| 2007/0097993 A1 | 5/2007 | Bojahra et al. |
| 2007/0110192 A1 | 5/2007 | Steiner |
| 2007/0112939 A1 | 5/2007 | Wilson et al. |
| 2007/0121323 A1 | 5/2007 | Pawlik et al. |
| 2007/0165997 A1 | 7/2007 | Suzuki et al. |
| 2007/0176788 A1 | 8/2007 | Mor et al. |
| 2007/0229300 A1 | 10/2007 | Masato et al. |
| 2008/0055073 A1 | 3/2008 | Raneri et al. |
| 2008/0068126 A1 | 3/2008 | Johnson et al. |
| 2008/0068204 A1 | 3/2008 | Carmen et al. |
| 2008/0089266 A1 | 4/2008 | Orsat |
| 2008/0111491 A1 | 5/2008 | Spira |
| 2008/0136261 A1 | 6/2008 | Mierta |
| 2008/0136356 A1 | 6/2008 | Zampini et al. |
| 2008/0136663 A1 | 6/2008 | Courtney et al. |
| 2008/0147337 A1 | 6/2008 | Walters et al. |
| 2008/0148359 A1 | 6/2008 | Kezys et al. |
| 2008/0183316 A1 | 7/2008 | Clayton |
| 2008/0192767 A1 | 8/2008 | Howe et al. |
| 2008/0218099 A1 | 9/2008 | Newman |
| 2008/0258650 A1 | 10/2008 | Steiner et al. |
| 2008/0278297 A1 | 11/2008 | Steiner et al. |
| 2008/0284327 A1 | 11/2008 | Kang et al. |
| 2009/0079268 A1 | 3/2009 | Cook et al. |
| 2009/0085408 A1 | 4/2009 | Bruhn |
| 2009/0113229 A1 | 4/2009 | Cataldo et al. |
| 2009/0150004 A1 | 6/2009 | Wang et al. |
| 2009/0167484 A1 | 7/2009 | Burr |
| 2009/0206983 A1 | 8/2009 | Knode et al. |
| 2009/0251352 A1 | 10/2009 | Altonen et al. |
| 2009/0302782 A1 | 12/2009 | Smith |
| 2009/0315672 A1 | 12/2009 | Nantz et al. |
| 2009/0322251 A1 | 12/2009 | Hilgers |
| 2010/0012738 A1 | 1/2010 | Park |
| 2010/0031076 A1 | 2/2010 | Wan et al. |
| 2010/0052574 A1 | 3/2010 | Blakeley et al. |
| 2010/0052576 A1 | 3/2010 | Steiner et al. |
| 2010/0081375 A1 | 4/2010 | Rosenblatt et al. |
| 2010/0104255 A1 | 4/2010 | Yun et al. |
| 2010/0114242 A1 | 5/2010 | Doerr et al. |
| 2010/0127821 A1 | 5/2010 | Jones et al. |
| 2010/0134341 A1 | 6/2010 | Priest |
| 2010/0141153 A1 | 6/2010 | Recker et al. |
| 2010/0207532 A1 | 8/2010 | Mans |
| 2010/0207759 A1 | 8/2010 | Sloan et al. |
| 2010/0235008 A1 | 9/2010 | Forbes, Jr. et al. |
| 2010/0238001 A1 | 9/2010 | Veskovic |
| 2010/0238003 A1 | 9/2010 | Chan et al. |
| 2010/0244706 A1 | 9/2010 | Steiner et al. |
| 2010/0262296 A1 | 10/2010 | Davis et al. |
| 2010/0289430 A1 | 11/2010 | Stelzer et al. |
| 2010/0303099 A1 | 12/2010 | Rieken |
| 2011/0006908 A1 | 1/2011 | Frantz |
| 2011/0012738 A1 | 1/2011 | Nakamura et al. |
| 2011/0043163 A1 | 2/2011 | Baarman |
| 2011/0046792 A1 | 2/2011 | Imes et al. |
| 2011/0095622 A1 | 4/2011 | Feldstein et al. |
| 2011/0121654 A1 | 5/2011 | Recker et al. |
| 2011/0202910 A1 | 8/2011 | Venkatakrishnan et al. |
| 2011/0208369 A1 | 8/2011 | Yang et al. |
| 2011/0244798 A1 | 10/2011 | Daigle et al. |
| 2011/0244897 A1 | 10/2011 | Shibuya |
| 2011/0282495 A1 | 11/2011 | Fischer et al. |
| 2011/0305200 A1 | 12/2011 | Schoofs et al. |
| 2012/0018578 A1 | 1/2012 | Polcuch |
| 2012/0039400 A1 | 2/2012 | Rieken |
| 2012/0086561 A1 | 4/2012 | Ilyes et al. |
| 2012/0086562 A1 | 4/2012 | Steinberg |
| 2012/0091910 A1 | 4/2012 | Zhang et al. |
| 2012/0093039 A1 | 4/2012 | Rofougaran et al. |
| 2012/0094658 A1 | 4/2012 | Macias et al. |
| 2012/0108230 A1 | 5/2012 | Stepanian |
| 2012/0158203 A1 | 6/2012 | Feldstein |
| 2012/0163663 A1 | 6/2012 | Masoud et al. |
| 2012/0235504 A1 | 9/2012 | Kesler et al. |
| 2012/0235579 A1 | 9/2012 | Chemel et al. |
| 2012/0254961 A1 | 10/2012 | Kim et al. |
| 2012/0257543 A1 | 10/2012 | Baum et al. |
| 2012/0274670 A1 | 11/2012 | Lee et al. |
| 2012/0275391 A1 | 11/2012 | Cui et al. |
| 2012/0303768 A1 | 11/2012 | Fiennes |
| 2012/0306621 A1 | 12/2012 | Muthu |
| 2012/0315848 A1 | 12/2012 | Smith et al. |
| 2012/0322370 A1* | 12/2012 | Lee .......... H04L 67/141 455/41.1 |
| 2012/0328302 A1 | 12/2012 | Iizuka et al. |
| 2013/0010018 A1 | 1/2013 | Economy |
| 2013/0014224 A1 | 1/2013 | Graves et al. |
| 2013/0026947 A1 | 1/2013 | Economy et al. |
| 2013/0030589 A1 | 1/2013 | Pessina et al. |
| 2013/0051375 A1 | 2/2013 | Chemishkian et al. |
| 2013/0073431 A1 | 3/2013 | Suro et al. |
| 2013/0100855 A1 | 4/2013 | Jung et al. |
| 2013/0134783 A1 | 5/2013 | Mohammediyan et al. |
| 2013/0187563 A1 | 7/2013 | Sasai et al. |
| 2013/0211844 A1 | 8/2013 | Sadwick |
| 2013/0223279 A1 | 8/2013 | Tinnakornsrisuphap et al. |
| 2013/0261821 A1 | 10/2013 | Lu et al. |
| 2013/0286889 A1 | 10/2013 | Cherian et al. |
| 2013/0322281 A1 | 12/2013 | Ludlow et al. |
| 2014/0070919 A1 | 3/2014 | Jackson et al. |
| 2014/0106735 A1 | 4/2014 | Jackson et al. |
| 2014/0163751 A1 | 6/2014 | Davis et al. |
| 2014/0175875 A1 | 6/2014 | Newman, Jr. et al. |
| 2014/0177469 A1 | 6/2014 | Neyhart |
| 2014/0180487 A1 | 6/2014 | Bull |
| 2014/0277805 A1 | 9/2014 | Browne, Jr. et al. |
| 2014/0289825 A1 | 9/2014 | Chan et al. |
| 2014/0304773 A1 | 10/2014 | Woods et al. |
| 2014/0375421 A1* | 12/2014 | Morrison .......... G07C 9/00571 340/5.61 |
| 2014/0375428 A1* | 12/2014 | Park ................. G06K 7/10237 340/10.1 |
| 2015/0017973 A1* | 1/2015 | Gold ................... H04M 1/7253 455/420 |
| 2015/0097666 A1 | 4/2015 | Boyd et al. |
| 2015/0200925 A1 | 7/2015 | Lagerstedt et al. |
| 2015/0259078 A1 | 9/2015 | Filipovic et al. |
| 2015/0342011 A1 | 11/2015 | Brochu et al. |
| 2016/0119032 A1* | 4/2016 | Choi ................... H04B 5/0031 455/41.1 |
| 2016/0148449 A1 | 5/2016 | God et al. |
| 2016/0149411 A1 | 5/2016 | Neyhart |
| 2016/0254699 A1 | 9/2016 | Carmen, Jr. |
| 2016/0285550 A1 | 9/2016 | Economy |
| 2017/0064798 A1 | 3/2017 | Economy et al. |
| 2018/0168019 A1 | 6/2018 | Baker et al. |
| 2018/0198893 A1 | 7/2018 | Newman, Jr. et al. |
| 2018/0205460 A1 | 7/2018 | Economy |

FOREIGN PATENT DOCUMENTS

| | | |
|---|---|---|
| EP | 0767551 B1 | 8/2002 |
| EP | 1727399 A2 | 11/2006 |
| EP | 1693991 B1 | 7/2009 |
| GB | 2533675 A | 6/2016 |
| WO | 1999046921 A2 | 9/1999 |
| WO | 2001052515 A1 | 7/2001 |

(56) References Cited

FOREIGN PATENT DOCUMENTS

| | | | |
|---|---|---|---|
| WO | 2001074045 | A1 | 10/2001 |
| WO | 2002071689 | A2 | 9/2002 |
| WO | 2001052515 | A9 | 10/2002 |
| WO | 2002071689 | A3 | 11/2002 |
| WO | 2003007665 | A1 | 1/2003 |
| WO | 2004023849 | A1 | 3/2004 |
| WO | 2004056157 | A1 | 7/2004 |
| WO | 2006133172 | A2 | 12/2006 |
| WO | 2007069129 | A2 | 6/2007 |
| WO | 2008040454 | A2 | 4/2008 |
| WO | 2008092082 | A2 | 7/2008 |
| WO | 2008095250 | A1 | 8/2008 |
| WO | 2009010916 | A2 | 1/2009 |
| WO | 2010027412 | A1 | 3/2010 |
| WO | 2010143130 | A1 | 12/2010 |
| WO | 2018099793 | A1 | 6/2018 |

OTHER PUBLICATIONS

"Crestron NFC Demo at CEDIA Expo 2012" Available at http://www.youtube.com/watch?v=FQ1f5vxwqnl Retrieved on Aug. 13, 2013 Transcript of Video provided on CD Media Sep. 10, 2012 pp. 1-2.

"SimpleLink™ CC3000 Boosterpack Jump-Starts the Internet of Things" Available at http://www.youtube.com/watch?v=6kh0g0KMIQc retrieved on Aug. 13, 2013 Transcript of Video provided on CD Media Jun. 6, 2013 1 page.

Black Rich "Clear Connect RF Technology" Lutron Electronics Company Inc. Aug. 2009 16 pages.

Gade Lisa "PalmOne Treo 600 Palm OS Smartphone from Sprint PCS" Oct. 28, 2013 Mobile Tech Review Document Available at: <http://www.mobiletechreview.com/treo_600.htm> Retrieved on May 21, 2013 4 Pages.

Gade Lisa "PalmOne Treo 650 Palm OS Smartphone: CDMA (Sprint) and GSM Versions" Dec. 10, 2004 Mobile Tech Review Document Available at: <http://web.archive.org/web/20050404004524/http://www.mobiletechreview.com/Treo_650.htm> Retrieved on May 21, 2013 6 Pages.

JSJSDesigns PLC "JS JS Products" Available at: <http://web.archive.org/web/20101111085355/http://www.jsjsdesigns.com/product.html> Nov. 11, 2010 4 pages.

Myers Dana "SimpleLink™ Wi-Fi® CC3000—First Time Config Using PC" Available at http://www.youtube.com/watch?v=10U4NTgkjLs retrieved on Aug. 13, 2013 Transcript of Video provided on CD Media Dec. 18, 2012 pp. 1-2.

Myers Dana "SimpleLink™ Wi-Fi® CC3000—First Time Config with Smartphone" Available at http://www.youtube.com/watch?v=fxP9hnZysgo Retrieved on Aug. 13, 2013 Transcript of Video provided on CD Media Sep. 19, 2012 pp. 1-2.

Rustybrick Inc. "iPhone 4 Morse Code Transmission App" Available at <http://www.rustybrick.com/iphone-morse-code.php> Jan. 4, 2011 3 pages.

Texas Instruments "CC3000 Smart Config" Available at http://processors.wiki.ti.com/index.php/CC3000_Smart_Config retrieved in Feb. 2, 2016 pp. 1-5.

* cited by examiner

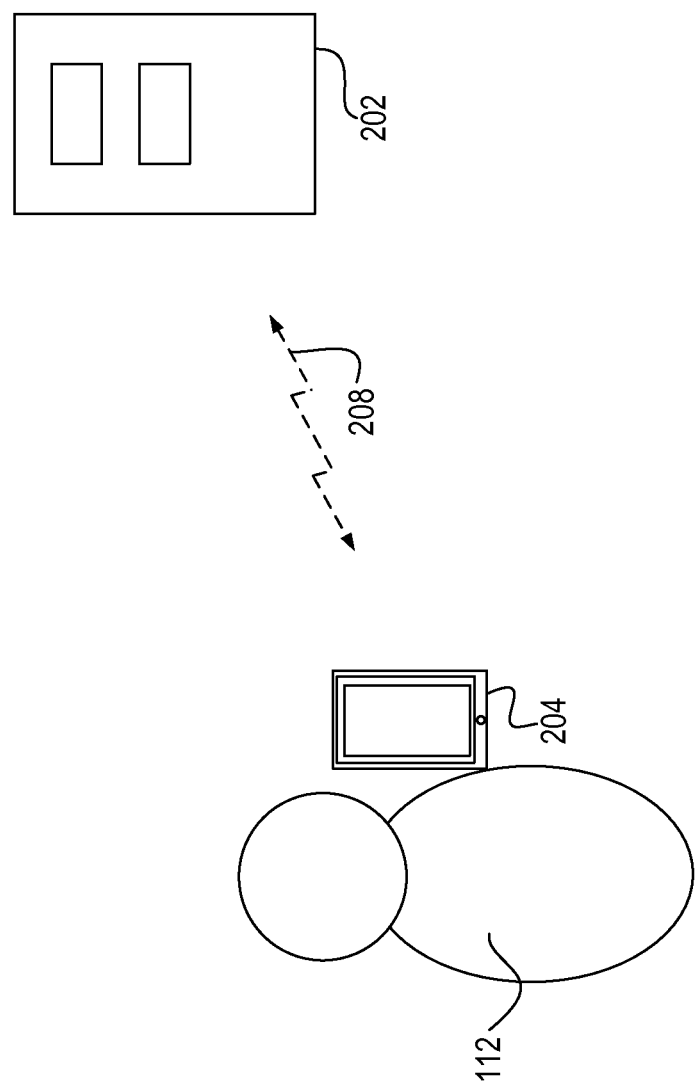

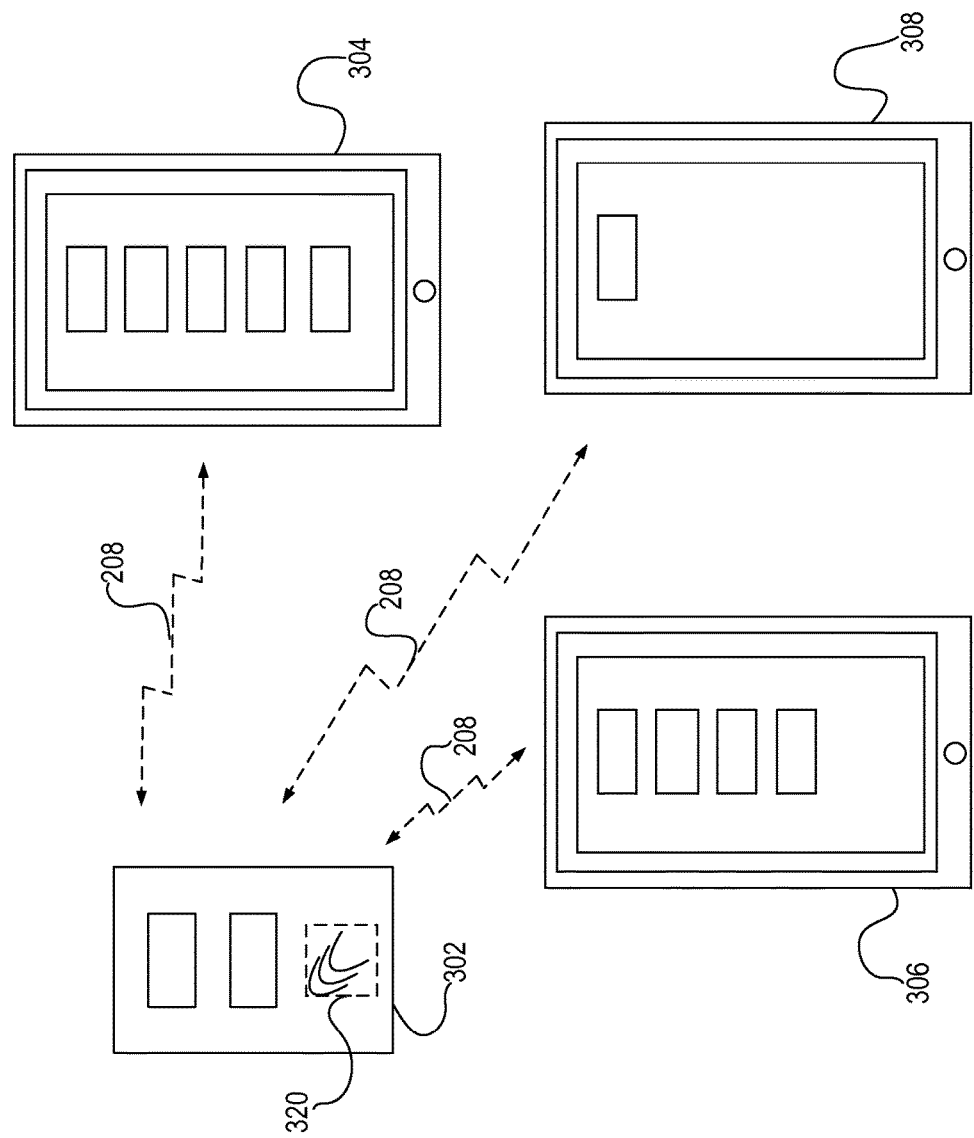

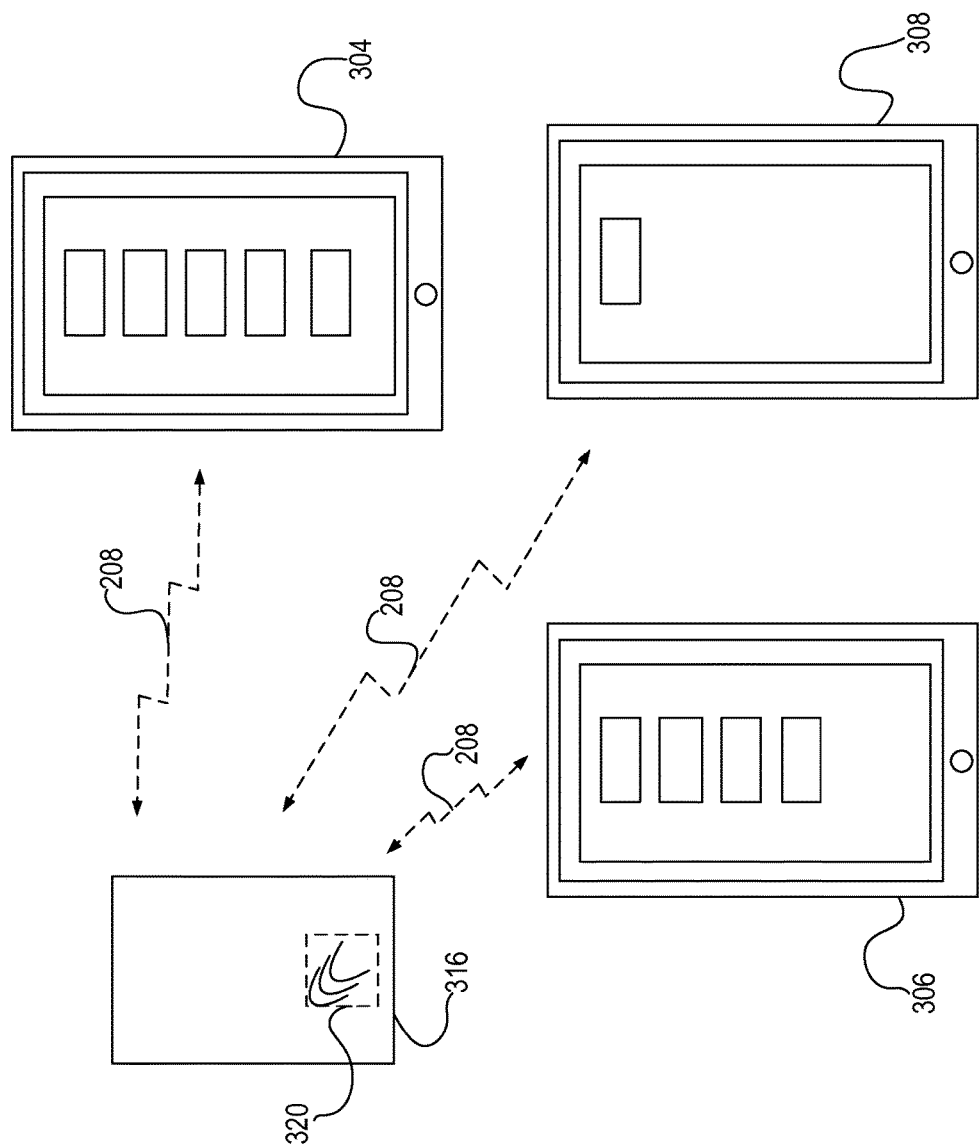

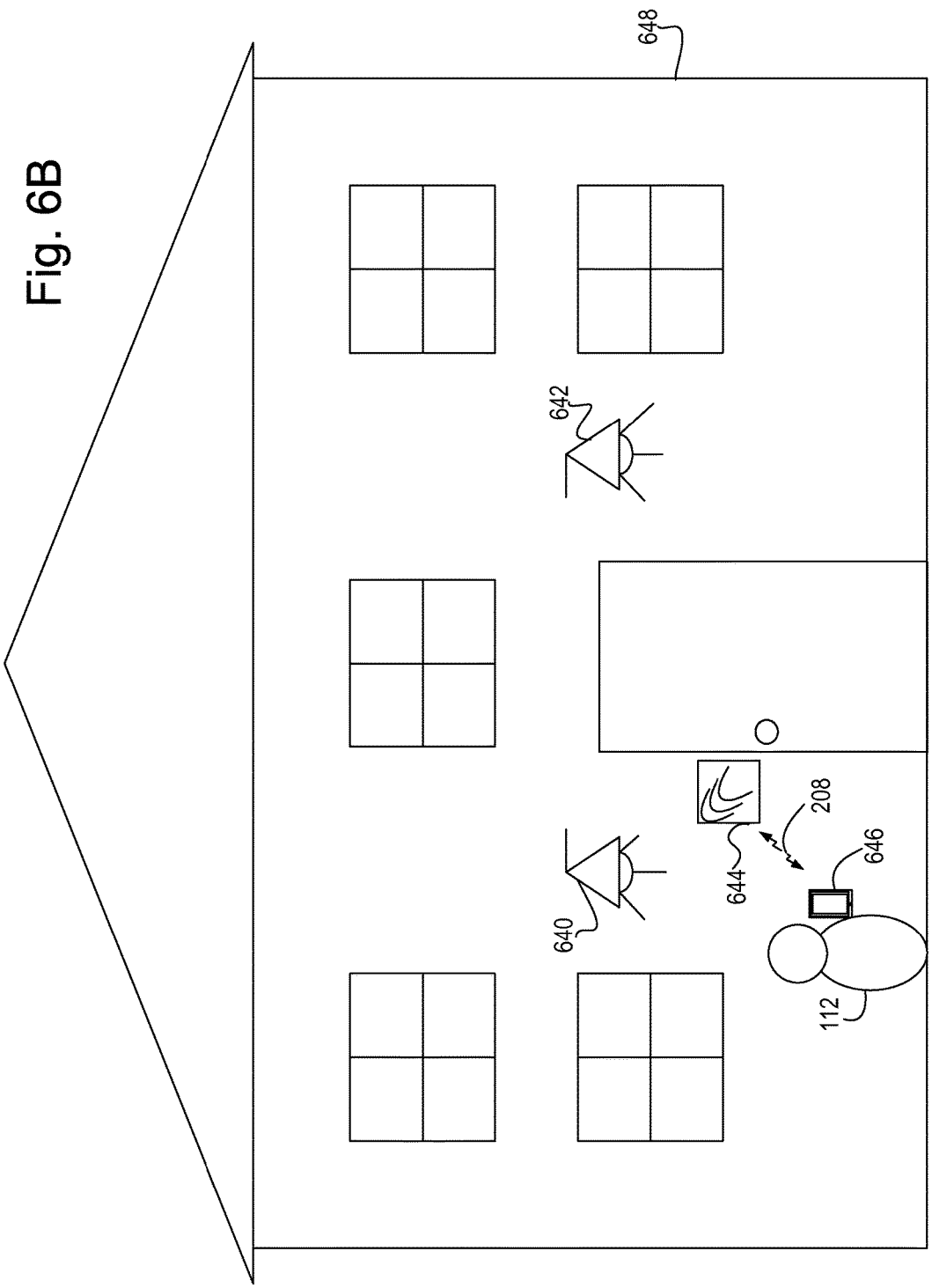

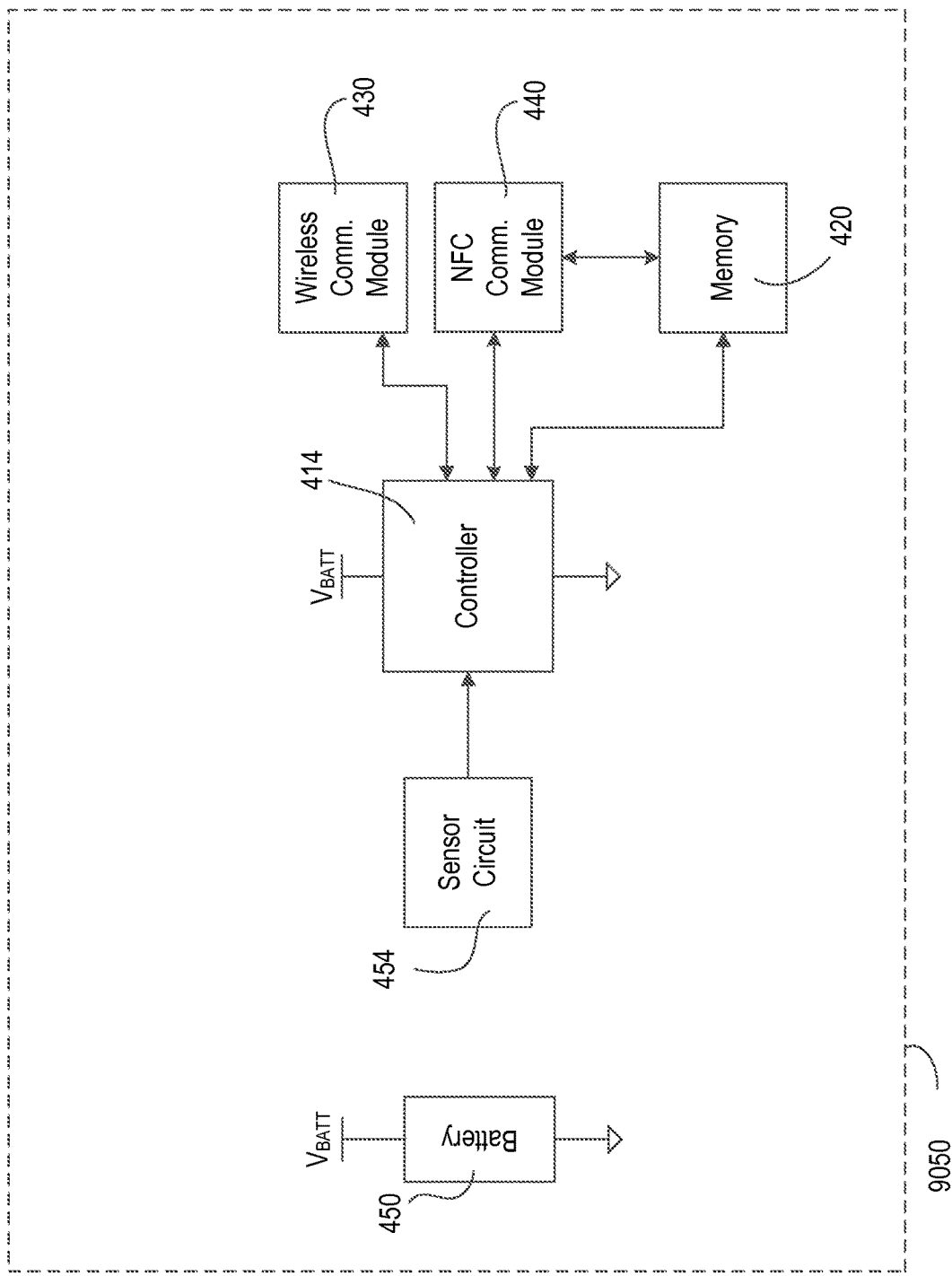

LOAD CONTROL DEVICE USER INTERFACE AND DATABASE MANAGEMENT USING NEAR FIELD COMMUNICATION (NFC)

CROSS-REFERENCE TO RELATED APPLICATIONS

This application is a continuation of U.S. patent application Ser. No. 13/837,575, filed Mar. 15, 2013, now U.S. Pat. No. 10,135,629, issued Nov. 20, 2018, the entire disclosure of which is incorporated herein by reference in its entirety.

BACKGROUND

In residential or commercial environments, a number of devices may be part of an energy control network, for example a smart home or commercial energy network. The devices of an energy control network may be used to control energy consumption, such as but not limited to lighting sources and heating resources. Such load control devices may communicate with one another via a wired or wireless network. Devices such as a dimmer switch, a plug-in load control device (PID), a temperature control device, a contact-closure output (CCO) pack, a remote controller, an occupancy sensor, a temperature sensor, a digital ballast controller, a motorized window treatment, a battery-powered remote control, an occupancy sensor, and/or a daylight sensor, among other devices, may be part of an energy control network. Examples of additional devices that may be part of such energy control networks are described in greater detail in commonly-assigned U.S. patent application Ser. No. 13/234,758, filed Sep. 16, 2011, entitled LOAD CONTROL SYSTEM HAVING AN ENERGY SAVINGS MODE, the entire disclosure of which is hereby incorporated by reference.

FIG. 1 illustrates an example of load control system (or an energy control network). As shown in FIG. 1, a user 112 may operate a lighting control device, such as a dimmer switch 106 for controlling a lighting load 132, and/or motorized window treatments 110 in room 130 using a remote control device 104 (e.g., a LUTRON® PICO® wireless remote control device). In addition, the dimmer switch 106 and/or the motorized window treatments 110 may be controlled automatically in response to an occupancy sensor 134. Also, the user 112 may use a temperature control device 102 to adjust a heating, air-conditioning, and ventilation (HVAC) system to control the temperature in the room 130. Similar systems have been developed to incorporate the use of other wireless devices (e.g., tablets and/or cellular phones) as remote load controls.

The temperature control device 102 may have a user interface that includes an "up" arrow and a "down" arrow to facilitate the adjustment of a temperature setpoint for the area that the temperature control device monitors and controls. The remote control device 104 may have a user interface that includes one or more buttons that can be used for functions like sending a "raise" and/or "lower" command to a shade control device, or perhaps an "on" or "off" (or assume a predetermined lighting "scene" command) to one or more lighting loads, like lighting load 132. The remote control device 104 may have more than two buttons (e.g. five buttons) that may be configured for effectuating five respective lighting scenes. Also, the dimmer switch 106 may have two buttons with which the user 112 can either raise or lower an intensity of the lighting load 132.

At the time of manufacture, a device that may become a part of an energy control network may be provided with a default (or initial) database that may correspond to the general functionality of the device. For example, the dimmer switch 106 at the time of manufacture may be provided with an initial dimmer switch database (or configuration) that may be downloaded to one or more, or all, dimmer switches at the time of manufacture. For example, downloading the initial device database to the dimmer switch 106 at the time of manufacture may involve establishing a physical electronic connection to the dimmer switch at some point in the process of manufacturing the dimmer switch 106. The initial device database can be downloaded to the dimmer switch 106, and at the time manufacturing is complete the dimmer switch 106 can be shipped to an end user, retail distributor, and/or installation contractor, for example.

When selected by an end user and/or installation contractor, a load control device may require that its initial database be replaced with a database specific to the particular device's actual functions and/or configuration. For example, dimmer switch 106 may require the specific device configuration that it is a two-button dimmer switch. Also by way of example, dimmer switch 106 may have illuminated push buttons (e.g. backlit) or may have other indicator lights (not shown). The specific device database downloaded to dimmer switch at the time it is installed (or replaced) may provide the dimmer switch 106 with the configuration corresponding to operation with the two backlit buttons and/or other indicator lights—where the initial database provided to the dimmer switch 106 at the time of manufacture may not provide such a specific corresponding configuration. The specific device database may be downloaded to the dimmer switch 106 via a physical electronic connection, or perhaps via a special sequence of inputs made through the buttons of the dimmer switch 106, which may be both cumbersome and time consuming. Also, the load control device may be added to a wireless communication network so that the specific device database may be provided via a protocol of the wireless communication network (e.g., the Wi-Fi protocol or the Clear Connect™ protocol). Adding the device to such a wireless communication network may also be both cumbersome and time consuming.

Also at the time a load control device is put into a specific application by an end user and/or contractor, a first load control device may be provided with information regarding the other load control devices with which the first load control device may wirelessly communicate. For example, the first load control device may communicate with the other load control devices on an energy control communications network (e.g. a Wi-Fi based network or a wireless proprietary protocol network). Such energy control communications network information (e.g. network addresses of devices to monitor and/or control) may be downloaded to the dimmer switch 106 via a physical electronic connection, or perhaps via a special sequence of inputs made through the buttons of the dimmer switch 106 (which again may be both cumbersome and time consuming). Also, the load control device may be added to a wireless communication network so that the energy control communications network information may be provided via a protocol of the wireless communication network (e.g., the Wi-Fi protocol or the Clear Connect™ protocol). And adding the device to such a wireless communication network may also be both cumbersome and time consuming.

After providing the load control device with its specific device database and also after providing the load control device with the information required to communicate with other load control devices, the user interface of the load control device may be used to bring about the user-desired effects that the load control device has been specifically configured to provide. For example, a user can use the buttons of the dimmer switch 106 to increase or decrease the intensity of one or more lighting loads connected to the dimmer switch 106. However, the user is limited to the specific functionality provided by the particular configuration of the dimmer switch's 106 user interface. In other words, the user is limited to the functions provided by the two buttons on the dimmer switch 106, where the dimmer switch 106 may be specifically configured for more functionality than can be accessed by the two button user interface.

Should a load control device fail or become inoperative to perform its configured functions, then the inoperative device may require physical replacement. At the time the load control device is replaced, an end user and/or contractor may wish to provide the replaced load control device with the specific device database that was provided to the previous (now inoperative) load control device. To accomplish this, the end user and/or contractor may use the same techniques as were used to provide the previous load control device with its specific device database and load control network information. For example, that information may be downloaded to a replacement load control device via a physical electronic connection, or perhaps via a special sequence of inputs made through the user interface of the replacement load control device. Also, the replacement load control device may be added to a wireless communication network so that the specific device database may be provided via a protocol of the wireless communication network (e.g., the Wi-Fi protocol or the Clear Connect™ protocol). As mentioned previously, adding the device to such a wireless communication network may also be both cumbersome and time consuming.

Near Field Communication (NFC) is an emerging wireless data transfer protocol. Little network or administrative configuration may be needed to establish NFC protocol based wireless communication. And NFC may facilitate the wireless transfer of data at low data rates and within a relatively limited geographic range. It may be useful to utilize NFC for the purposes of managing the databases of load control devices and/or exploiting the configurable flexibility of load control device user interfaces.

SUMMARY

A load control device, perhaps at a time of manufacture, may be provided with a default (e.g. initial) database for a type of device that may correspond to the load control device. An initial device database may be selected based on the type of load control device and the selected initial database may be downloaded to the load control device via a low data rate and close proximity wireless protocol.

A load control device, perhaps at a time of installation, may be provided with a specific database for a type of device that may correspond to the load control device. A specific device database may be selected based on the type of load control device and the specific configuration of the load control device. The selected specific device database may be downloaded to the load control device via a low data rate and close proximity wireless protocol.

A load control device, perhaps at a time of installation, may be provided with a network database that may correspond to the load control device. A network database may be selected based on an energy control network that may correspond to a specific load control device. The selected network database may be downloaded to the load control device via a low data rate and close proximity wireless protocol.

A wireless control device may receive a signal from a load control device that may allow the wireless control device to display a specific user interface for the load control device. The wireless control device may receive a signal via a low data rate and close proximity wireless protocol. The signal may contain information that may identify the load control device. The wireless control device may determine a specific access level based on an identified load control device. If at least some access level is determined, the wireless device may display a user interface for the load control device specific to the determined level of access.

A load control device may be commanded to make an adjustment to one or more electrical loads in connection with the load control device. The command sent to the load control device may be originated by wireless communication between a wireless control device and a radio frequency identification (RFID) device via a low data rate and close proximity wireless protocol, for example near field communication (e.g. via an NFC tag).

A device database for a load control device may include a configuration for particular operation of the load control device. Should the load control device become inoperative for the configured operation, the device database of the inoperative load control device may be uploaded via a low data rate and close proximity wireless protocol. The uploaded device database may be downloaded to another load control device that may be operative for the configured operation via the low data rate and close proximity wireless protocol.

BRIEF DESCRIPTION OF THE DRAWINGS

FIG. 3A is an example specific device configuration via near field communication (NFC) upon an installation of a load control device.

FIG. 4A is a first example of a display of a load control device specific user interface on a wireless device using near field communication (NFC).

FIG. 4B is second example of a display of a load control device specific user interface on a wireless device using near field communication (NFC).

FIG. 6B depicts an example of adjusting one or more electrical loads based on an interaction between a specific user's wireless device and a radio-frequency identification (RFID) device as presented in FIG. 6A.

FIG. 11 is a simplified block diagram of an example sensor device that may be capable of NFC communication and implementing one or more of the techniques described herein.

DETAILED DESCRIPTION

Near Field Communication (NFC) is a reference to a collective of standards for wireless communication devices, such as "smart" cellular telephones, tablets, and laptops, among others, to establish radio communication with other such devices. NFC communication among NFC enabled devices may occur by touching the devices together or by bringing them into relatively close proximity, for example perhaps no more than a few centimeters. Applications of NFC include retail transactions and data transfer, or data exchange, among others. NFC may also occur between an NFC device (e.g., an NFC enabled device under power) and an unpowered, but otherwise functional, NFC module, or an unpowered device including an NFC module. For example, an NFC enabled device may communicate (via NFC) with a radio-frequency identification (RFID) device (e.g., an NFC tag). NFC may also enable a relatively simple setup of more complex communications, such as Wi-Fi Communication or Bluetooth, for example. The ease of establishing NFC may have certain tradeoffs. For example, NFC may provide for a relatively low rate of data exchange or transfer (e.g., low bandwidth communication). And NFC may not be considered a particularly reliable or secure wireless communication protocol, for example as compared to other wireless communication protocols (e.g., the Wi-Fi communication protocol). As referred to herein, an NFC tag and/or an RFID tag may include active and/or passive devices. For example, a passive NFC tag device or RFID tag device may be a sticker or a label that may receive power from radio frequency energy. An active NFC tag device or RFID tag device may include an powered NFC circuit (e.g., as may be located inside a load control device).

Figure 2A:
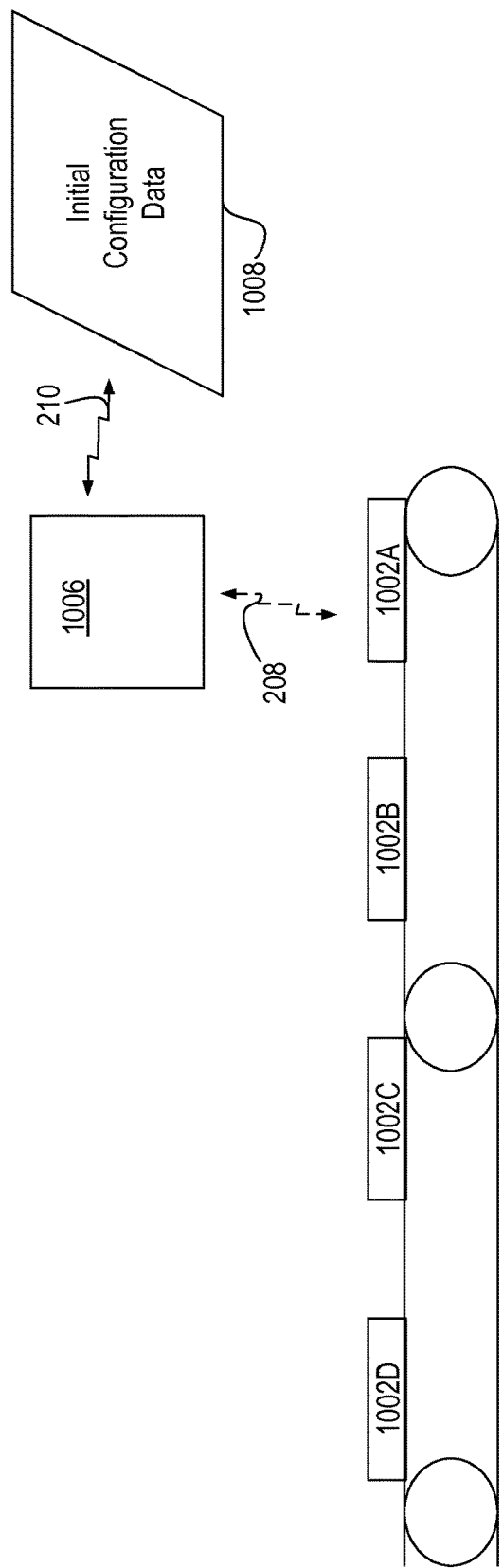
FIG. 2A is an example of an initial (e.g. default) configuration of a load control device via near field communication (NFC).

FIG. 2A is an example of an initial (e.g. default) configuration of a load control device via near field communication (NFC). By way of example, and not limitation, load control devices 1002A, 1002B, 1002C, and 1002D may be any of a number of load control devices, such as dimmer switches, occupancy sensors, remote control devices, temperature control devices, among other load control devices. Manufacturers may produce load control devices of a particular general type in relatively large numbers. For example, for the purpose of cost efficiencies and market demands, among other reasons, a manufacturer may produce large numbers of dimmer switches at a given time. And at other times or perhaps at a time parallel to the production of the dimmer switches, the manufacturer may produce large numbers of occupancy sensors or remote control devices. For purposes of explanation, the load control devices 1002A, 1002B, 1002C, and 1002D may be multi-button remote control selector switch devices.

At the time of manufacture, the manufacturer may not have sufficient information from which to provide the multi-button remote control selector switch devices 1002A-1002D with a specific device configuration. For example, an end-user who purchases (e.g. at some point in time) the respective load control devices 1002A-1002D, may have a particular operational configuration (or database) in mind for the device or devices that are purchased. Again by way of example, an end-user may purchase a three-button remote control selector switch for a kitchen area. Continuing the example, the first button of the three-button remote control selector switch device may, when activated by the end-user, effectuate a first particular lighting scene in the kitchen area. And the end-user may activate the second button and/or the third button of the three-button remote control selector switch device to effectuate a respective second and/or third lighting scene in the kitchen area. But load control device manufacturers often may not have knowledge of such specific device configurations for the load control devices 1002A-1002D that may be purchased by end-users. Thus, at the time of manufacture, the load control devices 1002A-1002D may not be provided with a specific device configuration (or database).

In addition to situations in which the manufacturer may not have sufficient information to develop a specific device configuration (or database), perhaps again for purposes of cost efficiencies, the manufacturer may wish to provide the load control devices 1002A-1002D with no more than an initial (or default) configuration (or database). The initial database may be based at least in part on the general type of the load control devices 1002A-1002D. For example, the general type of the load control devices 1002A-1002D may be a multi-button remote control device, for example. By providing at least an initial database for the load control devices 1002A-1002D at a time proximate to manufacture, the manufacturer may provide basic operational database parameters for the respective load control devices 1002A-1002D. The basic operational database parameters may be useful for the implementation of the specific device database that may be provided to the load control devices 1002A-1002D by an end-user. Also, providing the initial database may permit the manufacturer to determine the respective load control devices' 1002A-1002D general ability to accept a transfer of data, such as a download of database information, for example.

For example, at a time of manufacture, load control devices 1002A-1002D may be provided with an initial database for a multi-button remote control device using a wireless control device 1006. The wireless control device 1006 (e.g. a wireless control device) may be configured to communicate via at least two wireless communication protocols. For example, the wireless control device 1006 may include a first communication module that may be configured to wirelessly transmit and/or receive radio frequency (RF) signals 210 via a Wi-Fi protocol and/or a proprietary RF protocol such as Clear Connect™, among other RF protocols. The wireless control device 1006 may also include a second communication module that may be configured to wirelessly transmit and/or receive signals 208 via a close proximity and low data rate wireless protocol, such as the NFC protocol.

The wireless control device 1006 may communicate with a general load control device database 1008 via the RF signals 210 to obtain an initial database for a type of load control device. For example, a type of load control device may be entered into the wireless control device 1006. Based on the entered type of load control device, the wireless control device 1006 may search an internal memory for the initial device database for the load control device. If the wireless control device 1006 may not find the initial device database corresponding to entered type of load control device, the wireless control device 1006 may obtain the initial device database from the general load control device database 1008 via RF signals 210. When the wireless control device 1006 either locates and/or obtains the initial device database corresponding to the entered type of load control device, the wireless control device 1006 may transfer the initial device database to the respective load control device 1002A-1002D via NFC signals 208.

Figure 2B:
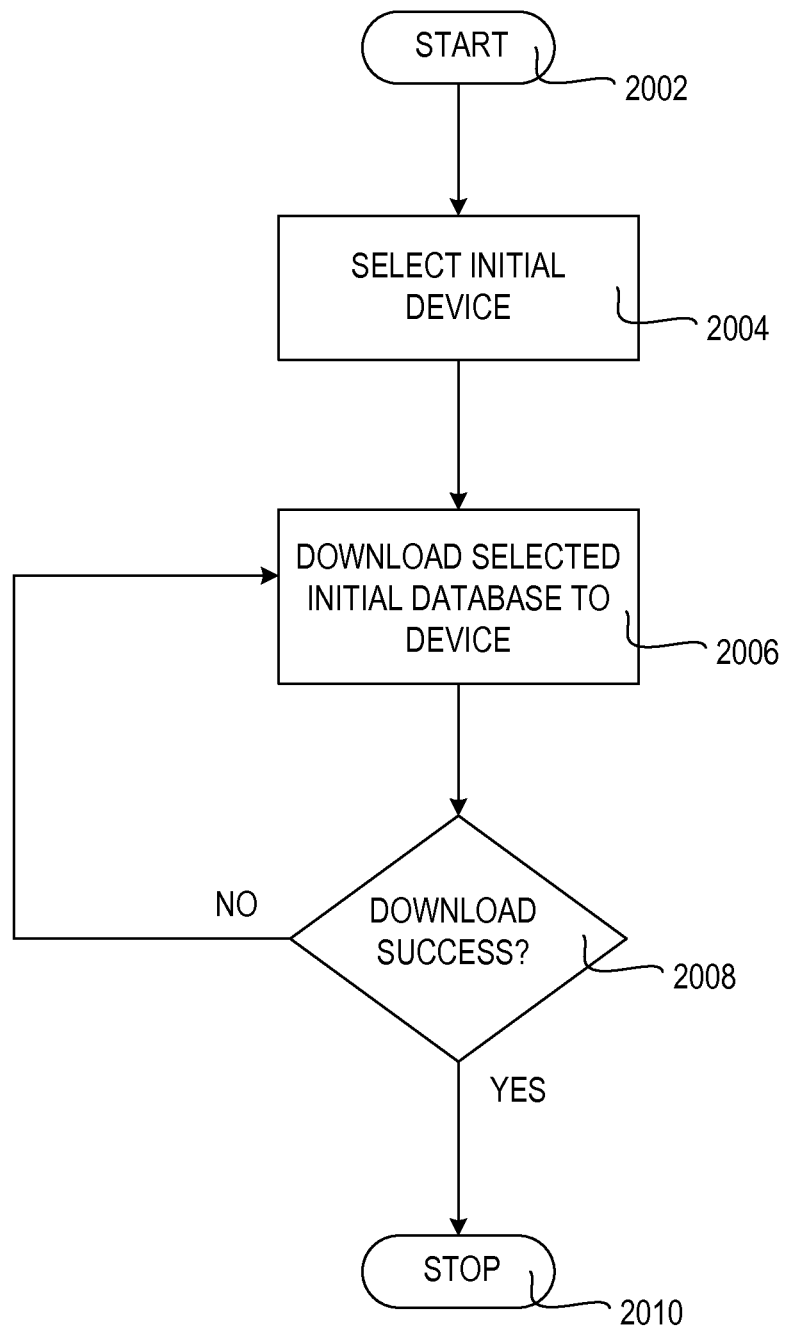
FIG. 2B is a flowchart of an example technique to download an initial configuration of a load control device via near field communication (NFC).

FIG. 2B is a flowchart of an example technique to download an initial configuration of a load control device via near field communication (NFC). At a starting point 2002, perhaps at some time proximate to the manufacture of a load control device or devices (e.g., load control devices 1002A-1002D, a manufacturer may decide to provide an initial database to the load control device. At 2004, an initial device database may be selected (e.g., at the wireless control device 1006), perhaps based on a load control device type (e.g., a multi-button remote control device). At 2006, the selected initial database may be downloaded to the load control device via a low data rate and close proximity wireless protocol (e.g. NFC signaling 208). At 2008, a successful initial database download may be confirmed (e.g., by the wireless control device 1006). At 2010, upon a successful initial device database download, the technique may end. If a successful download of the initial device database to the load control device is not confirmed, then the download of the initial device database via NFC signaling may be repeated (e.g., until successful and/or for a predetermined period of time).

FIG. 3A is an example specific device configuration via near field communication (NFC) upon an installation of a load control device. The load control device may be a multi-button remote control selector switch 202 with operational functionality similar to that described with respect to the remote control device 104. For example, by activating a first button of the remote control selector switch 202, a user 112 may effectuate a first preconfigured "scene" (e.g., certain lights set to a preconfigured level of intensity, certain shades set to a preconfigured extension length, etc.). Other buttons of the remote control selector switch 202 may effectuate other respective scenes, for example. Perhaps after either installing the remote control selector switch 202 for an initial installation, or perhaps after replacing a previously installed multi-button remote control selector switch 202 with a new unit for some reason, the newly installed multi-button remote control selector switch 202 may be operating with its initial configuration (e.g. a default configuration or database).

The user 112 may use a wireless control device 204 (e.g. a "smart" cellular phone) to provide the multi-button remote control selector switch 202 with a specific device configuration via NFC signaling 208. For example, the multi-button remote control selector switch 202 may be a two button remote control selector switch (as depicted in FIG. 3A). The wireless control device 204 may have a load control device application interface (API) that may enable the user 112 to select an appropriate specific device configuration (e.g. a specific device database) for a two button remote control device, like multi-button remote control selector switch 202. Also, the user 112 may select a specific device database for the newly installed multi-button remote control device 202 (e.g., button number one is configured to effectuate a first defined scene, and button number two is configured to effectuate a second defined scene).

The API on the wireless control device 204 may also enable the user 112 to provide the multi-button selector switch 202 via the NFC signaling 208 with information regarding a network (e.g., an energy control network) with which the multi-button selector switch device 202 may communicate. For example, the newly installed multi-button remote control selector switch device 202 may be provided with access information (e.g., network identifiers and/or security passwords, etc.) for a wireless communication network (e.g., a Wi-Fi network or a Clear Connect™ wireless network). And the API may provide the multi-button remote control selector switch 202 with the addresses of other load control devices with which the multi-button remote control selector switch 202 may communicate via the wireless communication network. For example, the multi-button remote control selector switch 202 may be provided via NFC signaling 208 with the wireless communication network addresses of the respective lighting loads and/or shades, etc., that may be part of the configured scenes respectively associated with the buttons of the multi-button remote control selector switch 202.

Figure 3B:
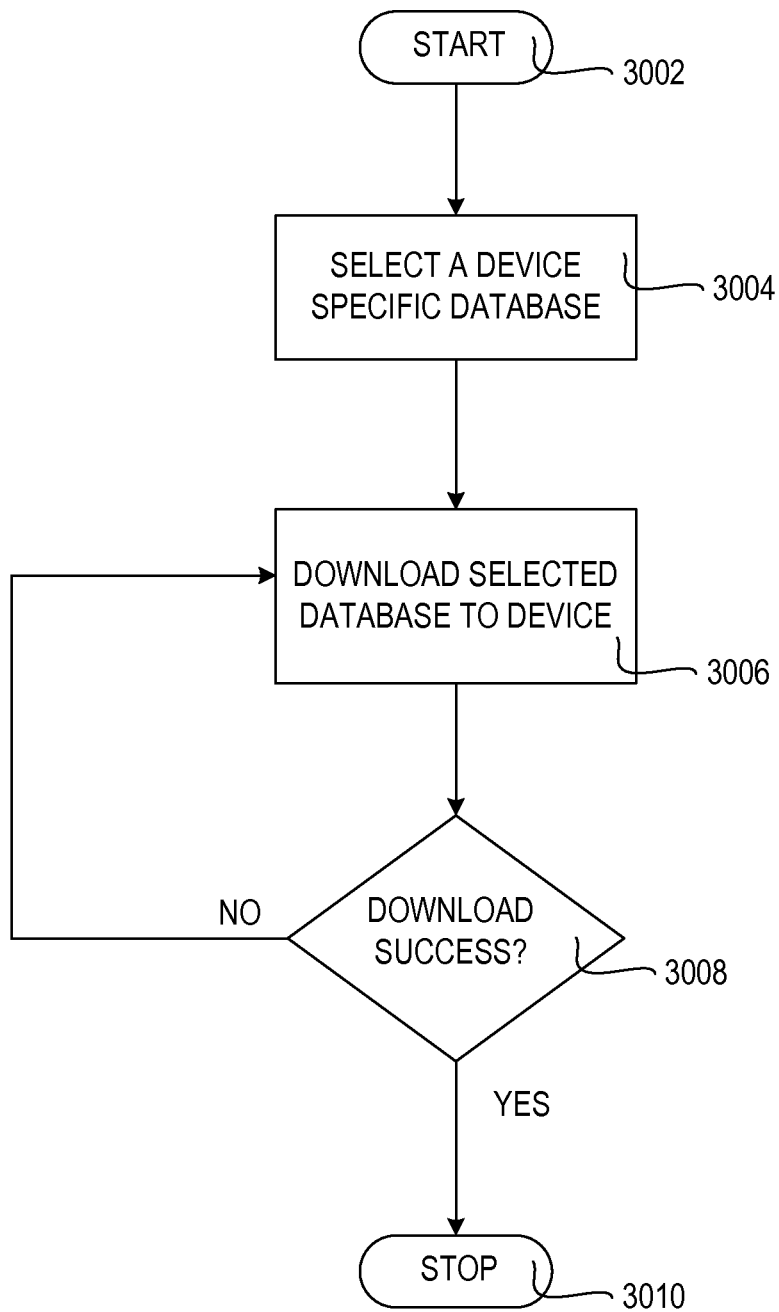
FIG. 3B is a flowchart of an example technique to download a specific device configuration of a load control device via near field communication (NFC).

FIG. 3B is a flowchart of an example technique to download a specific device database of a load control device via near field communication (NFC). At 3002, a load control device (e.g., the multi-button remote control selector switch 202 of FIG. 3) may be installed. At 3004, a device specific database may be selected (e.g., at the wireless control device 204), perhaps based on a device type (e.g., a multi-button remote control selector switch device), a device configuration (e.g., the two button remote control selector switch 202), and/or where the two buttons may be configured to effectuate certain predefined scenes as desired by the end-user. At 3006, the selected device specific database may be downloaded to the load control device via a low data rate and close proximity wireless protocol (e.g. NFC signaling 208). At 3008, a successful specific database download may be confirmed (e.g., by the wireless control device 204). At 3010, upon a successful specific device database download, the technique may end. If a successful download of the specific device database to the load control device is not confirmed, then the download of the specific device database via NFC signaling may be repeated (e.g., until successful and/or for a predetermined period of time).

Figure 3C:
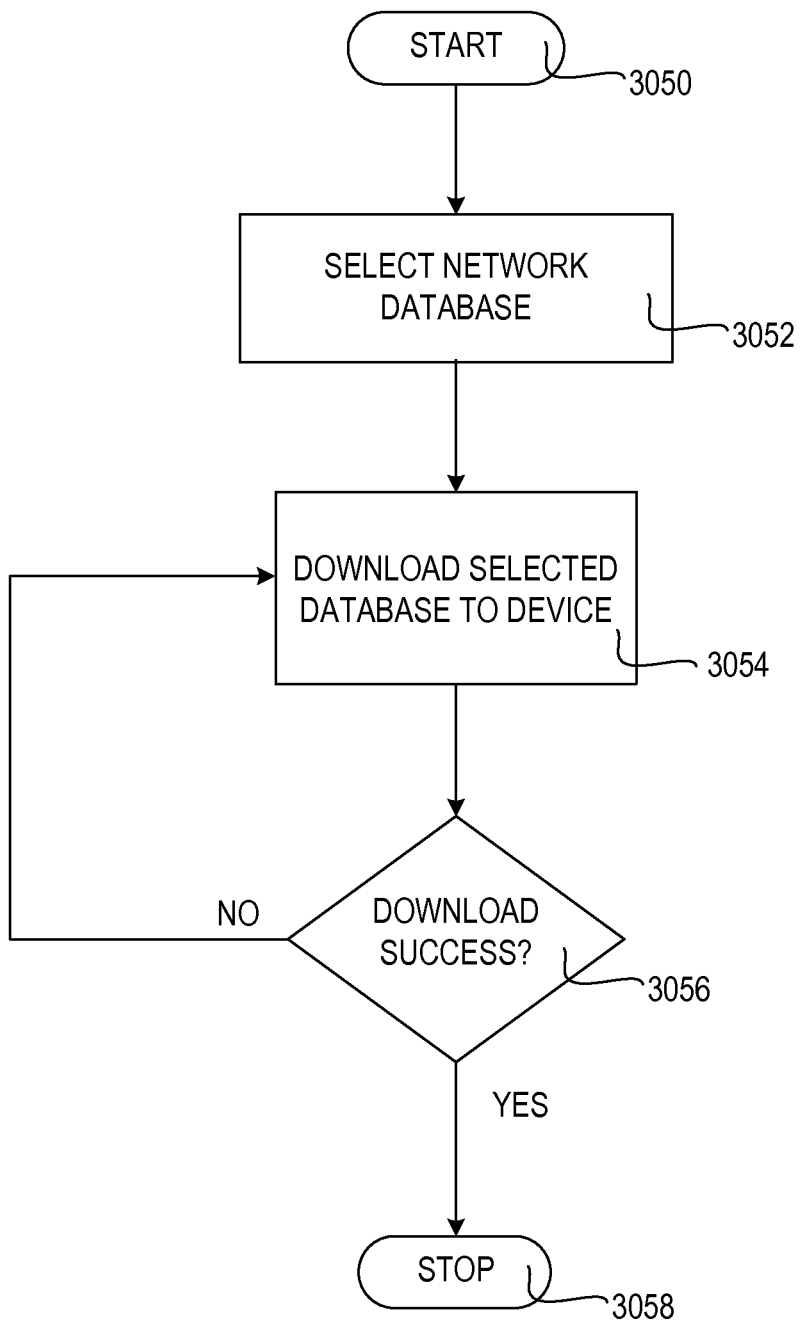
FIG. 3C is a flowchart of an example technique to download a load control network configuration of a load control device via near field communication (NFC).

FIG. 3C is a flowchart of an example technique to download a load control network configuration of a load control device via near field communication (NFC). At 3050, a load control device (e.g., the multi-button remote control selector switch 202 of FIG. 3) may be installed. At 3052, a network database may be selected (e.g., at the wireless control device 204 of FIG. 3), perhaps based on an energy control network corresponding to the load control device. At 3054, the selected network database may be downloaded to the specific load control device via a low data rate and close proximity wireless protocol (e.g. NFC signaling 208). At 3056, a successful network database download may be confirmed (e.g., by the wireless control device 204). At 3058, upon a successful network database download, the technique may end. If a successful download of the network database to the load control device is not confirmed, then the download of the network database via NFC signaling may be repeated (e.g., until successful and/or for a predetermined period of time).

FIG. 4A is a first example of a display of a load control device specific user interface on a wireless device using NFC. A load control device 302, which for purposes of explanation may be a two-button remote control selector switch, may include a RFID device 320. The RFID device 320 may be located within an enclosure of the two-button remote control selector switch 302, for example. Alternatively or additionally, the RFID device 320 may be located on the exterior or proximate to the enclosure of the two-button remote control selector switch 320. The RFID device 320 may include a command script that may be interpretable (e.g. via a NFC communication module of the two-button remote control selector switch 302—not shown) by a controller (not shown) of the two-button remote control selector switch 302. The command script of the RFID device 320 may include instructions that control the operation or functions of the two-button remote control selector switch 302. For example, the command script of the RFID device 320 may instruct the controller of the two-button remote control selector switch 302 as to what scene the respective two buttons may effectuate when activated by a user.

The wireless control devices 304, 306, and/or 308 (e.g., "smart" cellular phones or tablets) may communicate with the two-button remote control selector switch 302 via NFC signals 208 (e.g., via the NFC communication modules of the two-button remote control selector switch 302 and the wireless control devices 304, 306, and/or 308—not shown). The RFID device's 320 command script may be reconfigured via the NFC signaling 208 from one or more of the wireless control devices 304, 306, 308 that the RFID device 320 (and/or the RFID device's 320 command script and/or the two-button remote control selector switch 302) may be recognize as having the appropriate authority to reconfigure the RFID device's 320 command script. Appropriate authority may be determined by the RFID device 320 (and/or the RFID device's 320 command script and/or the two-button remote control selector switch 302) command script recognizing a respective identification (e.g. respective serial numbers) of the wireless control devices 304, 306, and/or 308.

The respective serial numbers of the wireless control devices 304, 306, and/or 308 may be communicated via the NFC signals 208. Also, the two-button remote control selector switch 302 may also have a serial number that may be communicated via the NFC signals 208. Appropriate authority and/or access level may be determined, for example, by that authority or access level that may be built into wireless control devices 304, 306, and/or 308. Also by way of example, the two-button remote control selector switch 302 may read the serial number off of the wireless control devices 304, 306, and/or 308 and may alter the RFID device's 320 command script for a particular session.

The wireless control devices 304, 306, and/or 308 may be configured (e.g., a controller of the wireless control devices 304, 306, and/or 308—not shown) to display device specific (or device user specific) graphical user interface (GUI) representations of the two-button remote control selector switch 302. The device specific GUI representations may be determined by the respective wireless control devices 304, 306, and/or 308 based, at least in part, on the two-button remote control selector switch's 302 serial number as may be communicated via the NFC signals 208. For example, the GUI of wireless control device 304 may represent five virtual buttons, the GUI of wireless control device 306 may represent four virtual buttons, and the GUI of wireless control device 308 may represent one virtual button. The device specific GUI representations may provide for unique control of the two-button remote control selector switch 302 by the respective wireless control devices 304, 306, and/or 308.

For example, the GUI of the wireless control device 304 may provide a user with a five virtual button operational configuration of the two-button remote control selector switch 302. And the virtual button operational configuration of the GUI of wireless control device 304 may be different than the functions of the two buttons of the two-button remote control selector switch 302 as configured on the controller of the two-button remote control selector switch 302 and/or the RFID device's 320 command script. For example, the controller of the two-button remote control selector switch 302 and/or the RFID device's 320 command script may recognize the serial number of the wireless control device 304, 306, and/or 308 that may be sending a command to effectuate the function (or different function or different "scene") and, perhaps upon confirming the wireless control device's 304, 306, and/or 308 authority or access level, may implement the commanded function. Security considerations may be satisfied where the two-button remote control selector switch 302 and/or the RFID device's 320 command script may request and/or confirm an authority or access level for a commanded function. Authority and/or access levels may vary among the respective wireless control devices 304, 306, and/or 308 and/or users thereof.

By way of further example, the first virtual button of the GUI of the wireless device 304 may, when activated by a user, effectuate a different scene than would be effectuated by the user physically activating the first button on the two-button remote control selector switch 302. The scene effectuated by the first button of the GUI of the wireless device 304 may be a personalized scene preferred and preconfigured by a user of the wireless device 304. Further, the second virtual button of the GUI of the wireless device 304 may, when activated by a user, effectuate a different scene than would be effectuated by the user physically activating the second button on the two-button remote control selector switch 302. The three other virtual buttons of the GUI of wireless device may effectuate other personalized scenes for the user of the wireless device 304. In a similar fashion, the four virtual buttons presented by the GUI of wireless control device 306 may effectuate four respectively personalized scenes for the user of the wireless device 306. And the one virtual button presented by the GUI of wireless control device 308 may effectuate one personalized scene for the user of the wireless device 306.

Alternatively or additionally, the functions of the two buttons of the two-button remote control selector switch 302 as configured on the controller of the two-button remote control selector switch 302 and/or the RFID device's 320 command script may be changed based on the NFC signal 208 interaction with one or more of the wireless control devices 304, 306, and/or 308. For example, the GUI representation of the wireless control device 304 may provide for a function that, when implemented by a user of the wireless control device 304, may send a command to the two-button remote control selector switch 302 to reconfigure the functions of either one or both of the two buttons of the two-button remote control selector switch 302. The commanded reconfiguration may occur on the controller of the two-button remote control selector switch 302 and/or on the RFID device's 320 command script. The commanded reconfiguration of either one or both buttons two-button remote control selector switch 302 may occur after the controller of the two-button remote control selector switch 302 and/or the RFID device 320 confirms that the wireless control device 304 has the appropriate authority or access level to command such a reconfiguration.

For example, when a user of the wireless control device 304 implements the reconfiguration function (and perhaps after an authority and/or access level may be requested and/or confirmed), the functions or scenes effectuated by one or both physical buttons of the two-button remote control selector switch 302 may be changed. The changed functions or scenes of one or both physical buttons of the two-button remote control selector switch 302 may mirror the functions or scenes that may be effectuated by the first virtual button and/or the second virtual button of the GUI representation of the wireless control device 304. Alternatively or additionally, the changed functions or scenes of one or both physical buttons of the two-button remote control selector switch 302 may mirror the functions or scenes that may be effectuated by one of the other virtual buttons of the GUI representation of the wireless control device 304, for example.

Alternatively or additionally, the controller of the two-button remote control selector switch 302 and/or the RFID device 320 may be configured to change (or reconfigure) the functions of one or both buttons of the two-button remote control selector switch 302 upon detecting NFC signaling 208 with one or more of the wireless control devices 304, 306, and/or 308. The controller of the two-button remote control selector switch 302 and/or the RFID device 320 may request and/or confirm that the wireless control device 304 has an authority or access level corresponding to a reconfiguration upon detection of NFC signaling 208. Such a confirmation may be based on the serial number of the wireless control device 304 as communicated via NFC signaling 208. After the authority or access level may be confirmed, the controller of the two-button remote control selector switch 302 and/or the RFID device's 320 command script may change (or reconfigure) the functions of one or both of the buttons of the two-button remote control selector switch 302. The functions of one or both of the buttons of the two-button remote control selector switch 302 may remain as they were reconfigured, perhaps until the functions are changed once again by NFC signaling 208 interaction with another wireless control device (e.g. wireless control device 306) with the appropriate authority or access level to cause such a reconfiguration.

FIG. 4B is second example of a display of a load control device specific user interface on a wireless device using NFC. FIG. 4B includes a blank-face (e.g. no physical button or manual operators) remote control device 316. The blank-face remote control device 316 may function in a similar manner as the two-button remote control selector switch 302 of FIG. 4A, with the exception that a user may not effectuate any functions (or scenes) via physical contact with the blank-face remote control device 316. The functions, elements, and interactions of the RFID device 320 and the wireless control devices 304, 306, and/or 308 may be the same or similar as those described with regard to FIG. 4A. By using the blank-face remote control device 316, a higher level of security considerations may be satisfied. For example, one or more, or all, of the functions controlled by the blank-face remote control device 316 may be implemented via commands generated from the personalized GUI representations of the respective wireless control devices 304, 306, and/or 308. And the blank-face remote control device 316 may request and/or confirm an authority or access level for the respective commands before effectuating the respective commands.

Figure 4C:
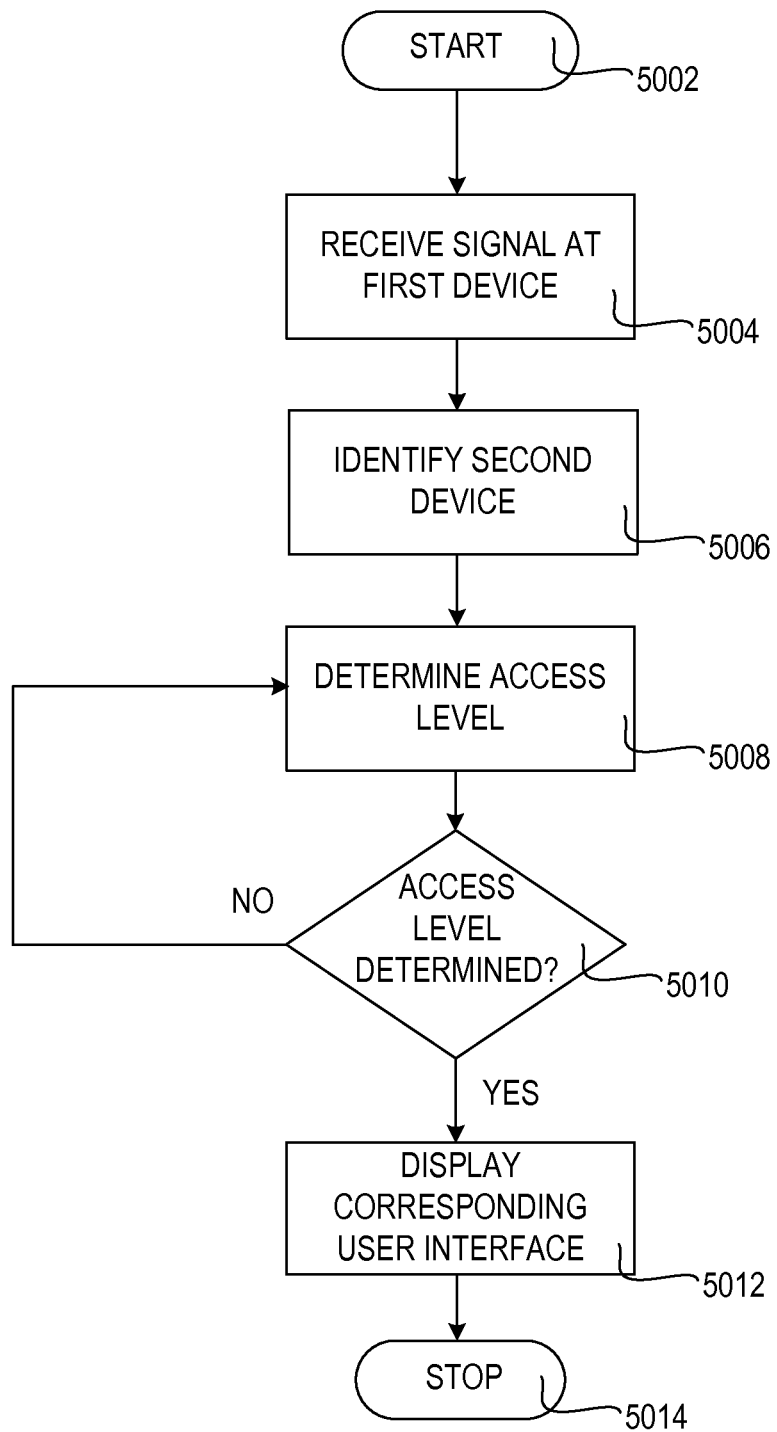
FIG. 4C is a flowchart of an example technique to display a load control device user interface via near field communication (NFC).

FIG. 4C is a flowchart of an example technique to display a load control device user interface via NFC. At 5002, a user may place a first device (e.g. wireless control device 304) in close proximity with a second device (e.g. a load control device like the two-button remote control selector switch 302) as a starting point. At 5004, the first device may receive a signal via a low data rate and close proximity wireless protocol (e.g. NFC signaling 208). At 5006, the second device may be identified based on information contained in the signal (e.g. a serial number of the load control device). At 5008, a specific access level may be determined by the first device based the identified second device. At 5010, the first device may determine if at least some specific access level exists. At 5012, upon determining that a specific access level exists, a user interface corresponding to the determined specific access level may be displayed on the first device. At 5014, the technique may end after the user interface corresponding to the determined specific access level is displayed, which may provide a user of the first device with user-specific control access for the second device.

Figure 4D:
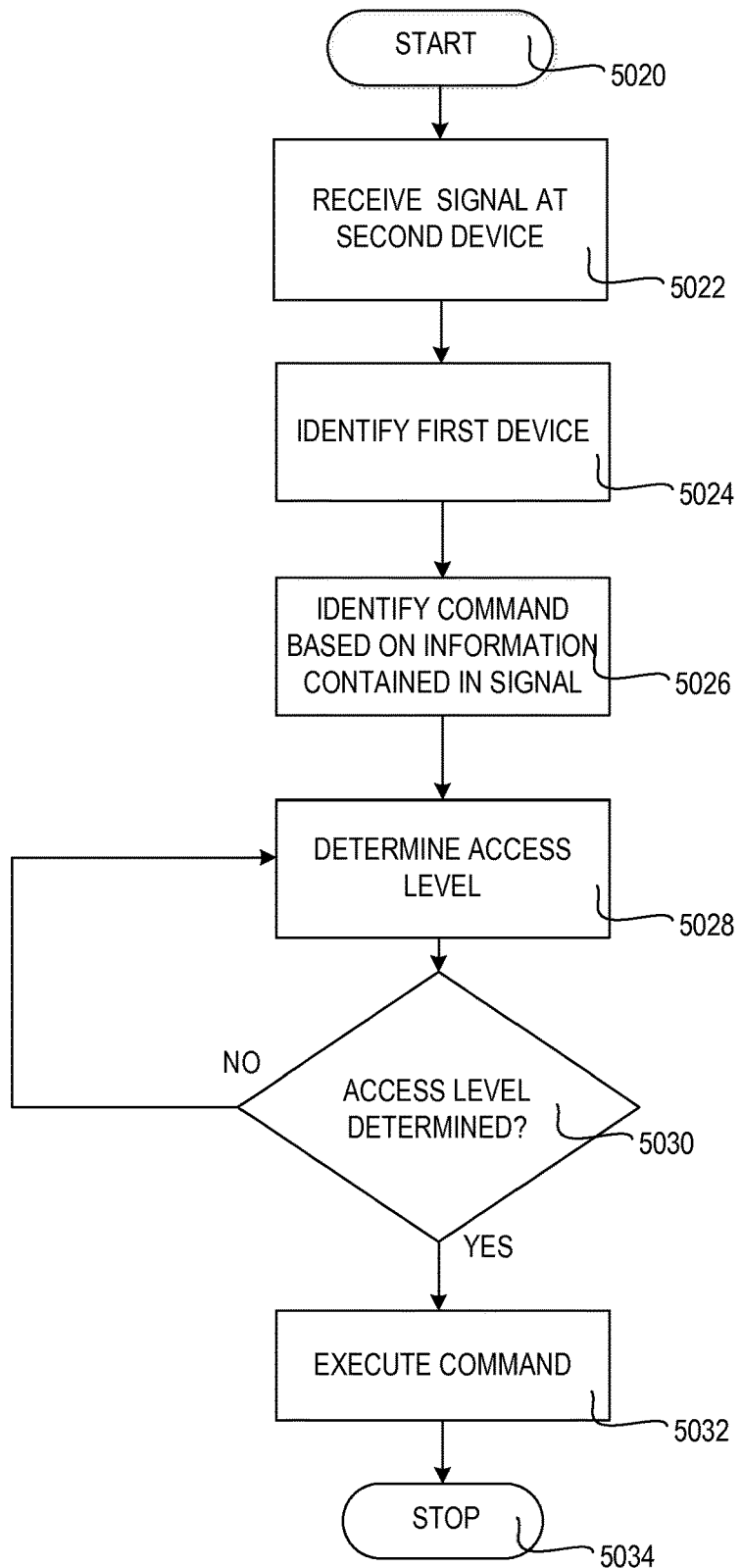
FIG. 4D is a flowchart of an example technique to operate a load control device via near field communication (NFC).

FIG. 4D is a flowchart of an example technique to operate a load control device via near field communication (NFC). At 5020, a user may place a first device (e.g. wireless control device 304) in close proximity with a second device (e.g. a load control device like the two-button remote control selector switch 302) as a starting point. At 5022, the second device may receive a signal via a low data rate and close proximity wireless protocol (e.g. NFC signaling 208). At 5024, the first device may be identified based on information contained in the signal (e.g. a serial number of the wireless control device 304). At 5026, a command may be identified based on information contained in the signal (e.g. a command to effectuate a particular lighting scene). At 5028, a specific access level may be determined by the second device based the identified first device. At 5030, the second device may determine if at least some specific access level exists. At 5032, upon determining that a specific access level exists, the command may be executed by the second device. At 5034, the technique may end after the command is executed, which may provide a user of the first device with a desired lighting scene.

Figure 5A:
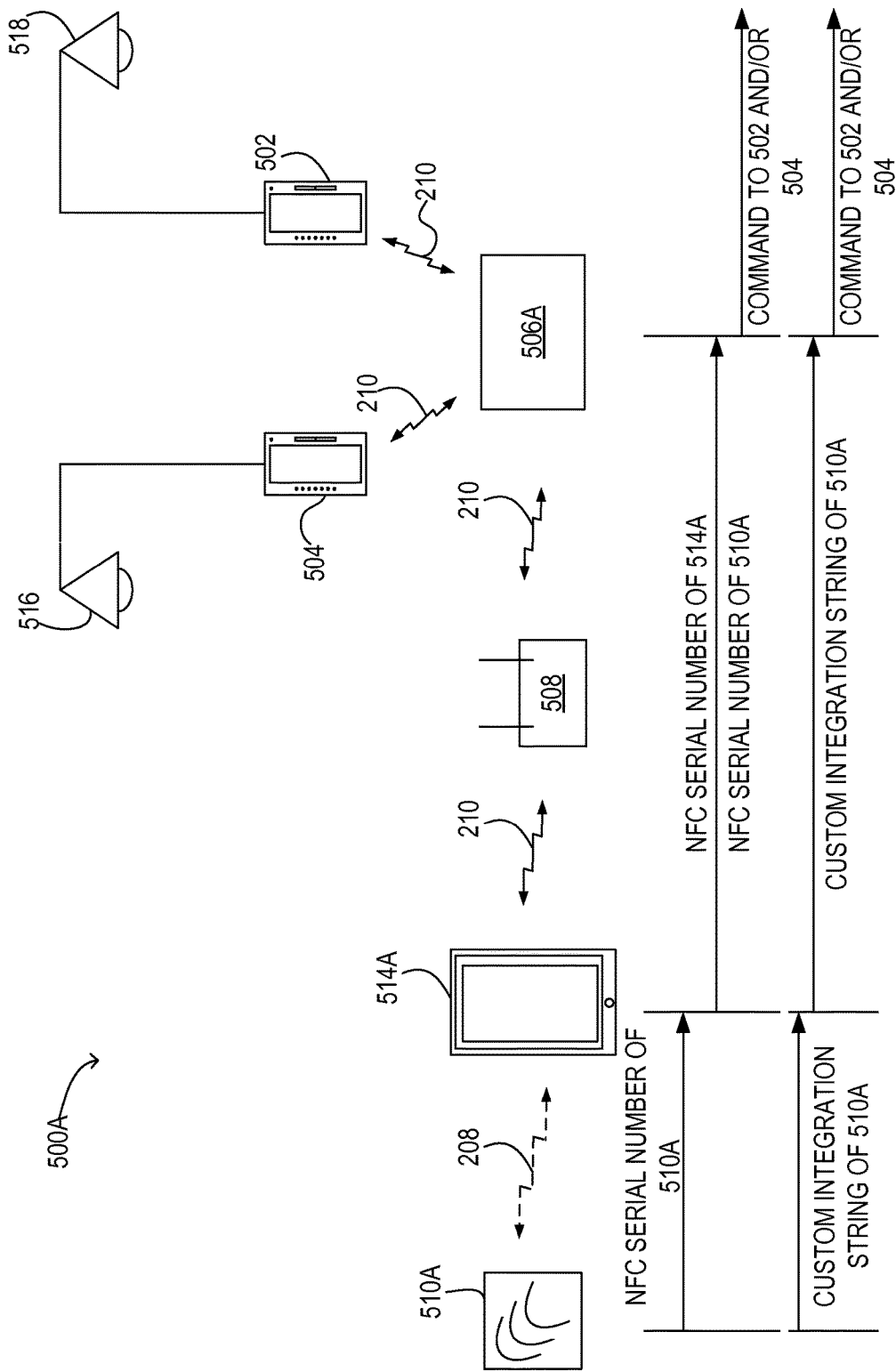
FIG. 5A depicts a first example adjustment of a lighting load with an interaction between a wireless device and a radio-frequency identification (RFID) device via near field communication (NFC).

FIG. 5A depicts a first example adjustment of a lighting load in a load control network 500A with an interaction between a wireless device and a radio-frequency identification (RFID) device via near field communication (NFC). An RFID device 510A, that may include a command script (not shown), may communicate via NFC signals 208 with a wireless control device 514A. The RFID device's 510A command script may be configured to send an identification of the RFID device 510A, such as but not limited to a serial number and/or a custom integration string of the RFID device 510A, when the wireless control device 514A comes into a proximity sufficient for NFC based communication.

The wireless control device 514A (and/or a receiver of the wireless control device 514A—not shown) may be configured to receive the serial number for RFID device 510A and/or the custom integration string for RFID device 510A. Upon receipt of the serial number and/or the custom integration string for RFID device 510A via the NFC signaling 208, the wireless control device 514A (and/or a controller of the wireless control device 514A—not shown) may be configured to initiate a wireless transmission (e.g. via a transmitter of the wireless control device 514A—not shown) of the serial number for RFID device 510A and/or an identification of the wireless control device 514A (e.g., a serial number of the wireless control device 514A) and/or the custom integration string of the RFID device 510A. The wireless transmission of the serial number for wireless device 514A and the serial number of the RFID device 510A may be made via radio-frequency (RF) signals 210, perhaps as part of a Wi-Fi protocol or a proprietary RF protocol (e.g. Clear Connect™).

The wireless transmission via RF signals 210 from the wireless control device 514A may be directed to a wireless control device 506A. In some configurations, the RF signals 210 from the wireless control device 514A to the wireless control device 506A may be conveyed via a wireless router 508 (e.g. a Wi-Fi router). Wireless control device 506A may be configured to communicate with dimmer switches 502 and/or 504 via RF signals 210. Upon receipt of the RF signals 210 from the wireless control device 514A, the wireless control device 506A may be configured to transmit one or more respective commands to the dimmer switches 502 and/or 504. And the dimmer switches 502 and/or 504 may effectuate the respective commands by adjusting the respective intensity of the connected lighting loads 516 and 518 to levels that may correspond to the respective commands. In other words, the wireless control device 506A may be configured to send respective commands to the dimmer switches 502 and/or 504 that may be preconfigured to correspond to the receipt of the RF signals 210 that include the serial numbers of the wireless control device 514A and/or the RFID device 510A (and/or the custom integration string of the RFID device of 510A).

For example, a user may locate the RFID device 510A at particular location in the user's home, perhaps on an end-table near the user's bed in the user's bedroom. At the time the user may wish to go to sleep, the user may place the wireless control device 514A (e.g. the user's cell phone) into close proximity with the RFID device 510A. The NFC signaling 208 that occurs between the RFID device 510A and the wireless control device 514A may trigger the communication from the wireless control device 514A to the wireless control device 506A. And the receipt by the wireless control device 506A of the RF signals 210 that includes, for example, the serial numbers of the wireless control device 514A and/or the RFID device 510A (and/or the custom integration string of the RFID device 510A) may be interpreted (e.g. according to a configuration) by the wireless control device 506A to cause the dimmer switches 502 and/or 504 to lower the intensity of the lighting loads 516 and/or 518 (e.g., perhaps turning both lights off).

Figure 5B:
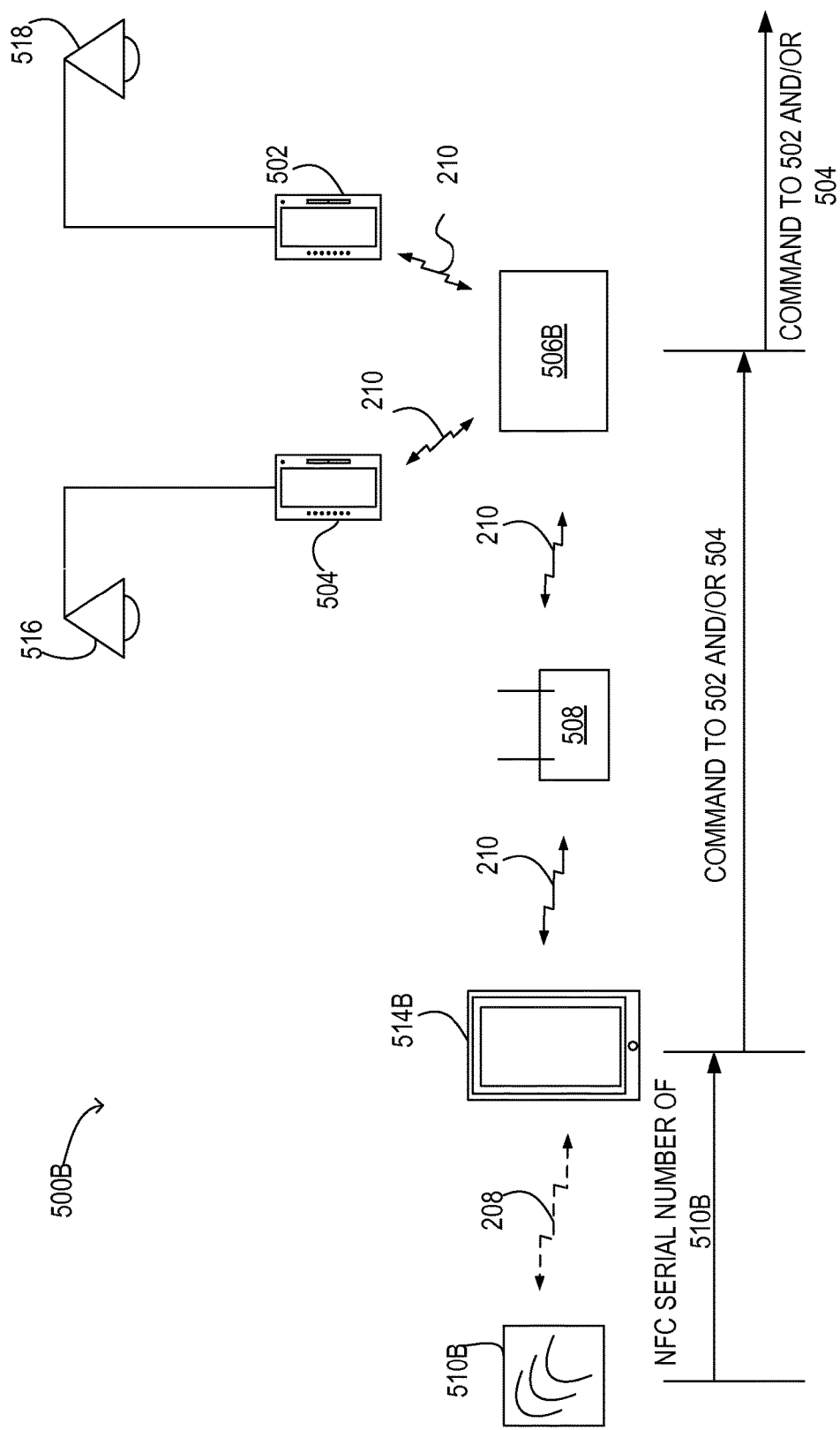
FIG. 5B depicts a second example adjustment of a lighting load with an interaction between a wireless device and a radio-frequency identification (RFID) device via near field communication (NFC).

FIG. 5B depicts a second example adjustment of a lighting load in a load control network 500B with an interaction between a wireless device and a radio-frequency identification (RFID) device via near field communication (NFC). An RFID device 510B, that may include a command script (not shown), may communicate via NFC signals 208 with a wireless control device 514B. The RFID device's 510B command script may be configured to send an identification of the RFID device 510B, such as but not limited to a serial number of the RFID device 510B, when the wireless control device 514B comes into a proximity sufficient for NFC based communication.

The wireless control device 514B (and/or a receiver of the wireless control device 514B—not shown) may be configured to receive the serial number for RFID device 510B. Upon receipt of the serial number for RFID device 510B via the NFC signaling 208, the wireless control device 514A (and/or a controller of the wireless control device 514B—not shown) may be configured to initiate a wireless transmission (e.g. via a transmitter of the wireless control device 514B—not shown) of one or more respective commands to the dimmer switches 502 and/or 504. The wireless transmission of the one or more respective commands to the dimmer switches 502 and/or 504 may be made via radio-frequency (RF) signals 210, perhaps as part of a Wi-Fi protocol or a proprietary RF protocol (e.g. Clear Connect™).

The wireless transmission via RF signals 210 from the wireless control device 514B may be directed to a wireless control device 506B. In some configurations, the RF signals 210 from the wireless control device 514B to the wireless control device 506B may be conveyed via a wireless router 508 (e.g. a Wi-Fi router). Wireless control device 506B may be configured to communicate with dimmer switches 502 and/or 504 via RF signals 210. Upon receipt of the RF signals 210 from the wireless control device 514B, the wireless control device 506B may be configured to transmit RF signals 210 to the dimmer switches 502 and/or 504 that correspond to the one or more respective commands to the dimmer switches 502 and/or 504 sent by wireless control device 514B. And the dimmer switches 502 and/or 504 may effectuate the respective commands by adjusting the respective intensity of the connected lighting loads 516 and 518 to levels that may correspond to the respective commands. In other words, the wireless control device 514B may be configured to send respective commands to the dimmer switches 502 and/or 504 that may be preconfigured to correspond to the receipt by the wireless control device 514B of the RF signals 208 that includes the serial number of the RFID device 510B.

In some configurations of load control network 500B, the wireless router 508 may be configured to, perhaps upon receipt of the RF signals 210 from the wireless control device 514B, transmit RF signals 210 to the dimmer switches 502 and/or 504 that correspond to the one or more respective commands to the dimmer switches 502 and/or 504 sent by wireless control device 514B. In such configurations, the commands to the dimmer switches 502 and/or 504 may not be forwarded by the wireless control device 506B.

For example, a user may locate the RFID device 510B at particular location in the user's home, perhaps near a door of the user's home. At the time the user may arrive home, the user may place the wireless control device 514B (e.g. the user's cell phone) into close proximity with the RFID device 510B. The NFC signaling 208 that occurs between the RFID device 510B and the wireless control device 514B may trigger (e.g. according to a configuration) the wireless control device 514B to send the respective commands to the dimmer switches 502 and/or 504 via RF signals 210. And the forwarding of the respective commands to the dimmer switches 502 and/or 504 via RF signals 210 from either of the wireless router 508 and/or the wireless control device 506B may cause the dimmer switches 502 and/or 504 to increase the intensity of the lighting loads 516 and/or 518 (e.g., perhaps turning both lights to 100% intensity).

Figure 5C:
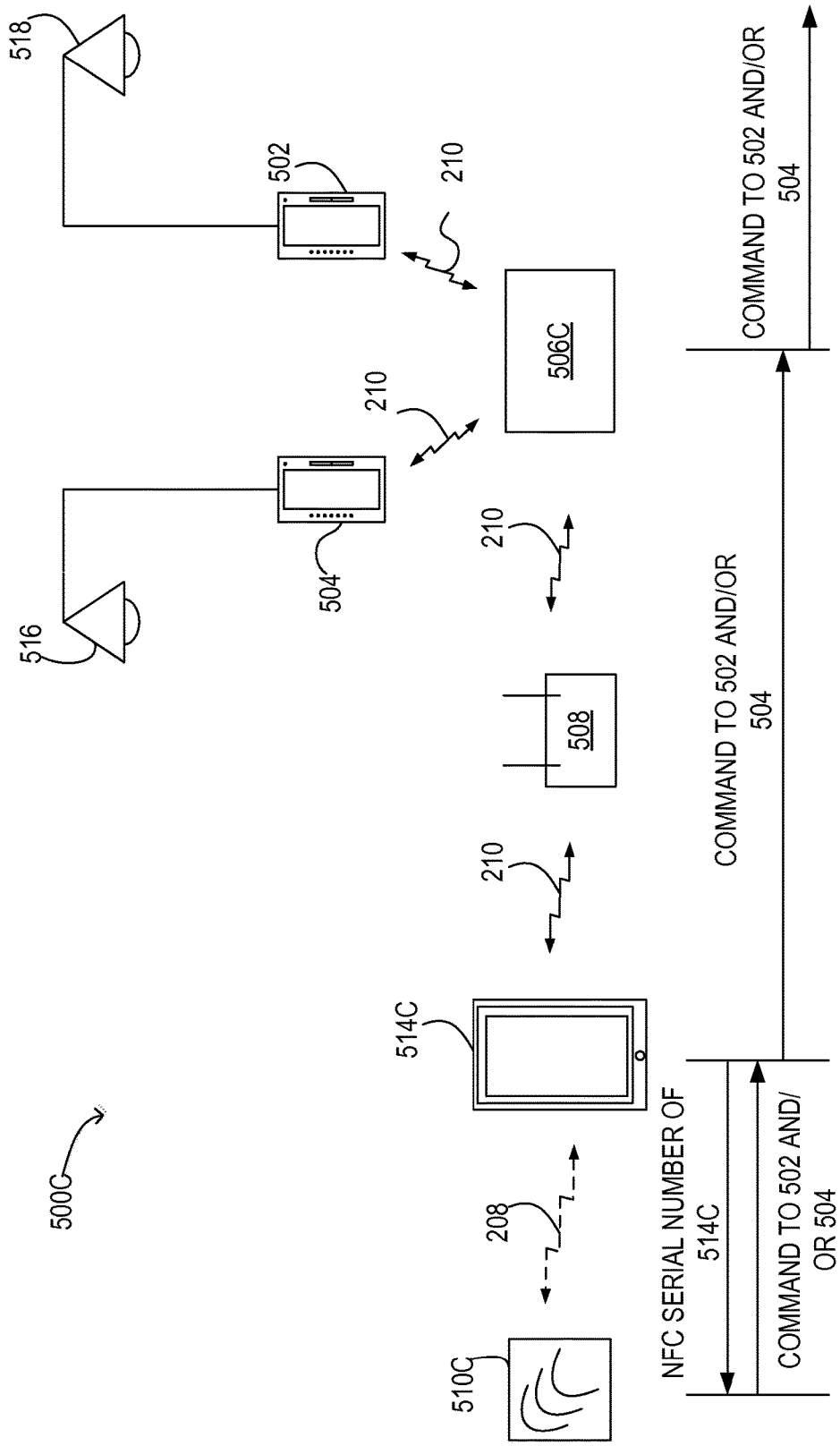
FIG. 5C depicts a third example adjustment of a lighting load with an interaction between a wireless device and a radio-frequency identification (RFID) device via near field communication (NFC).

FIG. 5C depicts a third example adjustment of a lighting load in a load control network 500C with an interaction between a wireless device and a radio-frequency identification (RFID) device via near field communication (NFC). An RFID device 510C, that may include a command script (not shown), may communicate via NFC signals 208 with a wireless control device 514C. The RFID device's 510C command script may be configured to receive an identification of the wireless control device 514C, such as but not limited to a serial number of the wireless control device 514C, when the wireless control device 514C comes into a proximity sufficient for NFC based communication. In other words, the wireless control device 514C (and/or a transmitter of the wireless control device 514C—not shown) may be configured to transmit the serial number for the wireless control device 514C via NFC signals 208 when the wireless control device 514C enters into a proximity sufficient for NFC based communication with the RFID device 510C (e.g., detection via NFC signals 208).

Upon receipt of the serial number for the wireless control device 514C via the NFC signaling 208, the RFID device's 510C command script may be configured to initiate a transmission of one or more respective commands to the dimmer switches 502 and/or 504 to the wireless control device 514C via NFC signals 208. The wireless control device 514C (and/or a receiver of the wireless control device 514C—not shown) may receive the one or more respective commands to the dimmer switches 502 and/or 504 sent via the NFC signals 208.

Upon receipt of the commands for the dimmer switches 502 and/or 504 via NFC signals 208, the wireless control device 514C may transmit RF signals 210 to the dimmer switches 502 and/or 504 that correspond to the respective commands for the dimmer switches 503 and/or 504 sent from the RFID device 510C. The wireless transmission of the one or more respective commands to the dimmer switches 502 and/or 504 made via RF signals 210 may be part of a Wi-Fi protocol or a proprietary RF protocol (e.g. the Clear Connect™ protocol).

The wireless transmission via RF signals 210 from the wireless control device 514C may be directed to a wireless control device 506C. In some configurations, the RF signals 210 from the wireless control device 514C to the wireless control device 506C may be conveyed via a wireless router 508 (e.g. a Wi-Fi router). Wireless control device 506C may be configured to communicate with dimmer switches 502 and/or 504 via RF signals 210. Upon receipt of the RF signals 210 from the wireless control device 514C, the wireless control device 506C may be configured to transmit RF signals 210 to the dimmer switches 502 and/or 504 that correspond to the one or more respective commands to the dimmer switches 502 and/or 504 sent by wireless control device 514C. And the dimmer switches 502 and/or 504 may effectuate the respective commands by adjusting the respective intensity of the connected lighting loads 516 and 518 to levels that may correspond to the respective commands. In other words, the RFID device 510C may be configured to send respective commands to the dimmer switches 502 and/or 504 that may be preconfigured to correspond to the receipt by the RFID device 510C of the RF signals 208 that include the serial number of the wireless control device 514C.

In some configurations of load control network 500C, the wireless router 508 may be configured to, perhaps upon receipt of the RF signals 210 from the wireless control device 514C, transmit RF signals 210 to the dimmer switches 502 and/or 504 that correspond to the one or more respective commands to the dimmer switches 502 and/or 504 sent by wireless control device 514C. In such configurations, the commands to the dimmer switches 502 and/or 504 may not be forwarded by the wireless control device 506C.

For example, a user may locate the RFID device 510C at particular location in the user's home, perhaps near an entrance to the user's family room. At the time the user may enter the family room, the user may place the wireless control device 514C (e.g. the user's cell phone) into close proximity with the RFID device 510C. The NFC signaling 208 that occurs between the RFID device 510C and the wireless control device 514C may trigger (e.g. according to a configuration) the RFID device 510C to send the respective commands for the dimmer switches 502 and/or 504 to the wireless control device 514C via RF signals 208. The wireless control device 514C may forward the commands for the dimmer switches 502 and/or 504 to the dimmer switches 502 and/or 504 via RF signals 210. And the forwarding of the respective commands to the dimmer switches 502 and/or 504 via RF signals 210 from either of the wireless router 508 and/or the wireless control device 506C may cause the dimmer switches 502 and/or 504 to change the intensity of the lighting loads 516 and/or 518 (e.g., perhaps turning lighting load 516 to 75% intensity and lighting load 518 to 50% intensity).

Figure 6A:
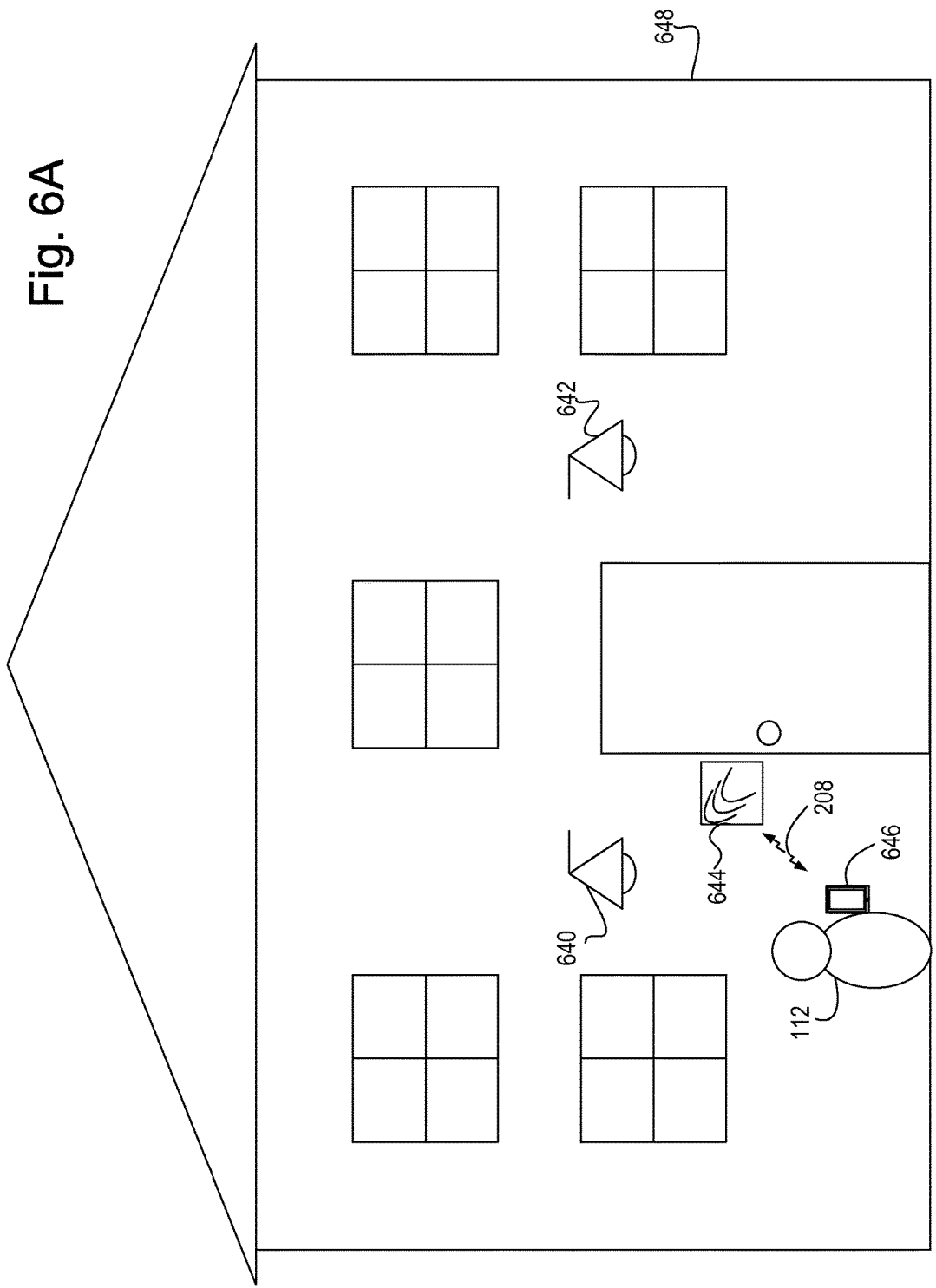
FIG. 6A depicts an example of an environment for adjusting one or more electrical loads based on an interaction between a specific user's wireless device and a radio-frequency identification (RFID) device.

FIG. 6A depicts an example of an environment for adjusting one or more electrical loads based on an interaction between a specific user's wireless control device and a radio-frequency identification (RFID) device. A user 112 may place an RFID device 644 in an area close to a door of user's 112 house 648. The RFID device 644 may include a command script (not shown). The user 112 may install outdoor lights 640 and/or 642. The user 112 may arrive home and wish to set a particular lighting scene in and around the house 648. And the user 112 may have configured the user's wireless control device 646 (e.g. the user's smart cell phone) and/or the RFID device's 644 command script to provide at least one particular lighting scene. In such configurations, at least one of the user's 112 desired scenes may be effectuated by various load control devices (not shown) by the placement of the wireless control device 646 into close proximity with the RFID device 644 such that NFC signals 208 may be exchanged between the RFID device 644 and the wireless control device 646.

FIG. 6B depicts an example of adjusting one or more electrical loads based on an interaction between a specific user's wireless control device and a radio-frequency identification (RFID) device as presented in FIG. 6A. As an effect of the placement of the wireless control device 646 into close proximity with the RFID device 644, commands may be sent to dimmer switches (not shown) that control the intensity of the outdoor lights 640 and/or 642. The commands to the dimmer switches may effectuate at least a part of the user's 112 desired lighting scene by setting the intensities of the outdoor lights 640 and/or 642 to 100%, for example.

Figure 6C:
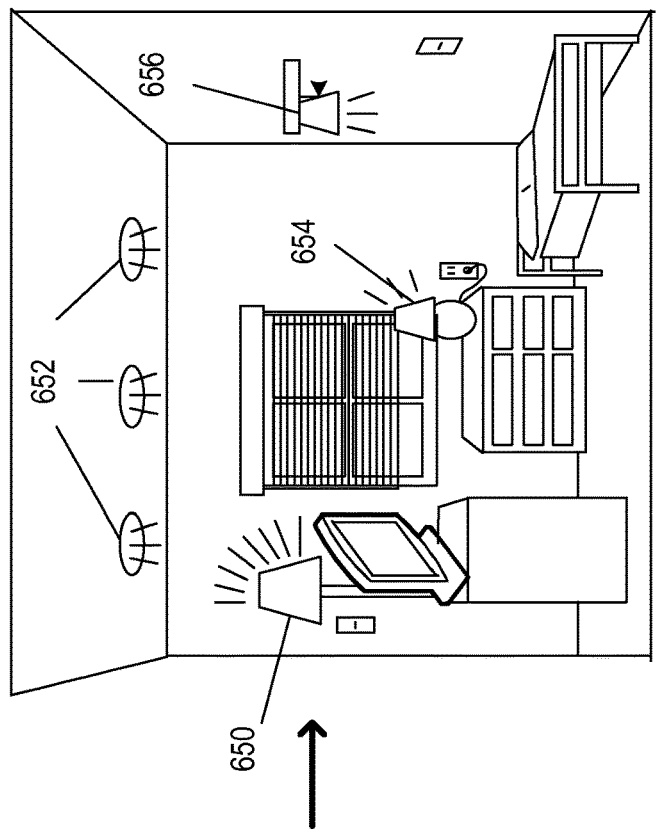
FIG. 6C depicts a further example of adjusting one or more electrical loads based on an interaction between a specific user's wireless device and a radio-frequency identification (RFID) device as presented in FIG. 6A.
Figure 6C:
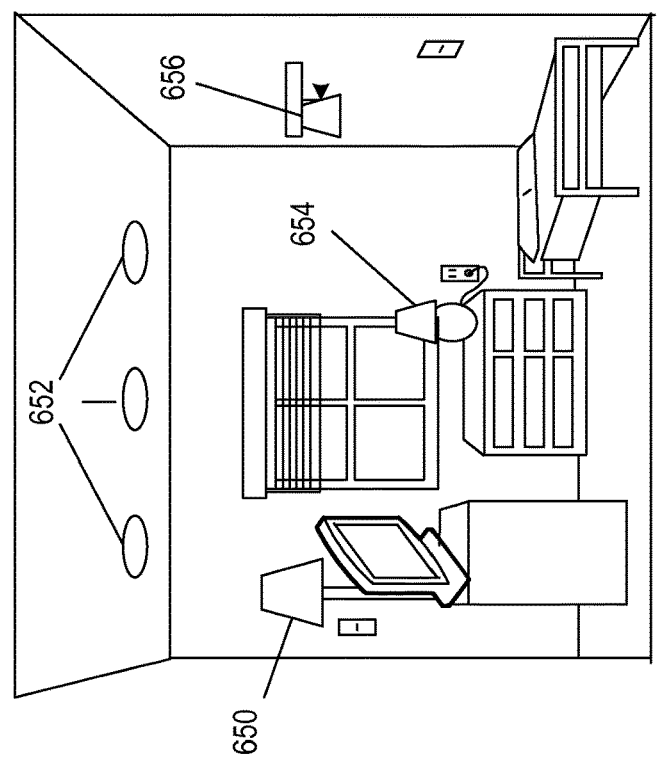

FIG. 6C depicts a further example of adjusting one or more electrical loads based on an interaction between a specific user's wireless control device and a radio-frequency identification (RFID) device as presented in FIG. 6A. As a further effect of the placement of the wireless control device 646 into close proximity with the RFID device 644, commands may be sent to dimmer switches and/or plug-in-device (PID) controllers (not shown) that control the intensity of indoor lights such as floor lamp 650, ceiling lights 652, table lamp 654, and light sconce 656. The commands to the dimmer switches and/or PID controllers may effectuate at least a part of the user's 112 desired lighting scene by setting the intensities of the floor lamp 650 and table lamp 654 to 100%, the intensities of the ceiling lights 652 to 50%, and the intensity of the light sconce 656 to 25%, for example.

Figure 7A:
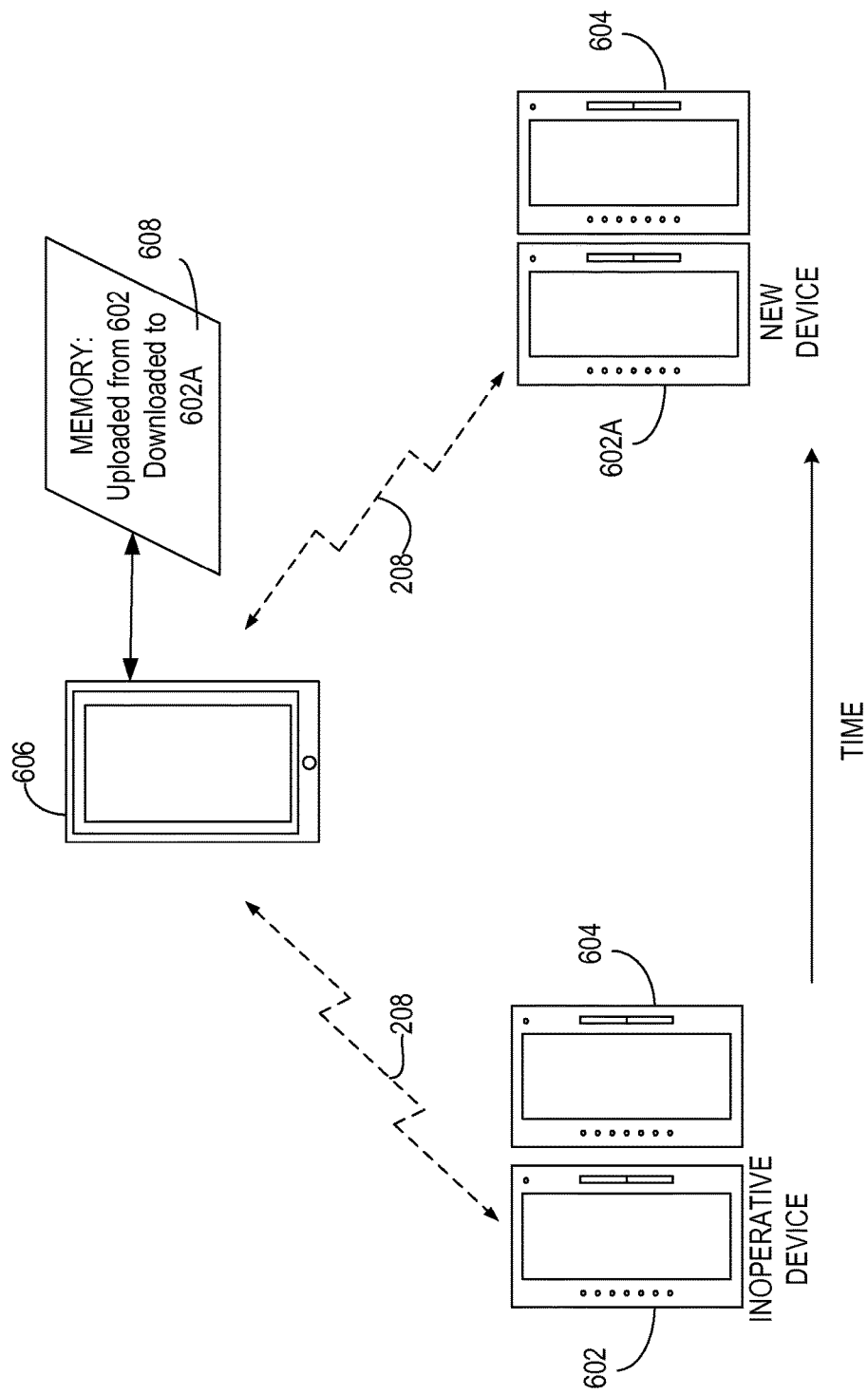
FIG. 7A depicts an example of a transfer via near field communication (NFC) of a device database of an inoperable load control device to a replacement load control device.

FIG. 7A illustrates an example of a transfer via near field communication (NFC) of a device database of an inoperable load control device to a replacement load control device. Load control devices, such as but not limited to dimmer switches 602 and 604, may be configured to control the intensities of respectively connected lighting loads (not shown). Dimmer switches 602 and/or 604 may also be configured for near field communication (NFC) (e.g., via respective NFC modules—not shown). From time to time, a load control device may become inoperative for one or more of its configured operations. For example, a failed component inside the dimmer switch 602 may prevent the dimmer switch 602 from adjusting the intensity of connected lighting load as configured by a user. However, the inoperative dimmer switch 602 may still be capable of near field communication. As such, a wireless control device 606 may be placed into sufficient proximity to initiate near field communication (e.g., via an NFC module not shown) with the inoperative dimmer switch 602.

The database of the inoperative dimmer switch 602 may be transferred from the inoperative dimmer switch 602 to the wireless control device 606 via NFC signals 208. The database transferred from the inoperative dimmer switch 602 may be stored in a memory 608 of the wireless control device 606. At some point in time, the inoperative dimmer switch 602 may be replaced with dimmer switch 602A. Dimmer switch 602A may be capable of being configured for, and may be capable of implementing, at least the same operations for which the inoperative dimmer switch 602 was configured.

The wireless control device 606 may be placed into sufficient proximity to transfer the database of the inoperative dimmer switch 602 to the new (or replacement) dimmer switch 602A via NFC signals 208. After receiving the database from the wireless control device 606, the dimmer switch 602A may perform at least the same functions as were performed by the inoperative dimmer switch 602. Although a dimmer switch was used to describe this technique, the aforementioned technique may be useful for other types of load control devices, such as occupancy sensors, remote control devices, etc.

Figure 7B:
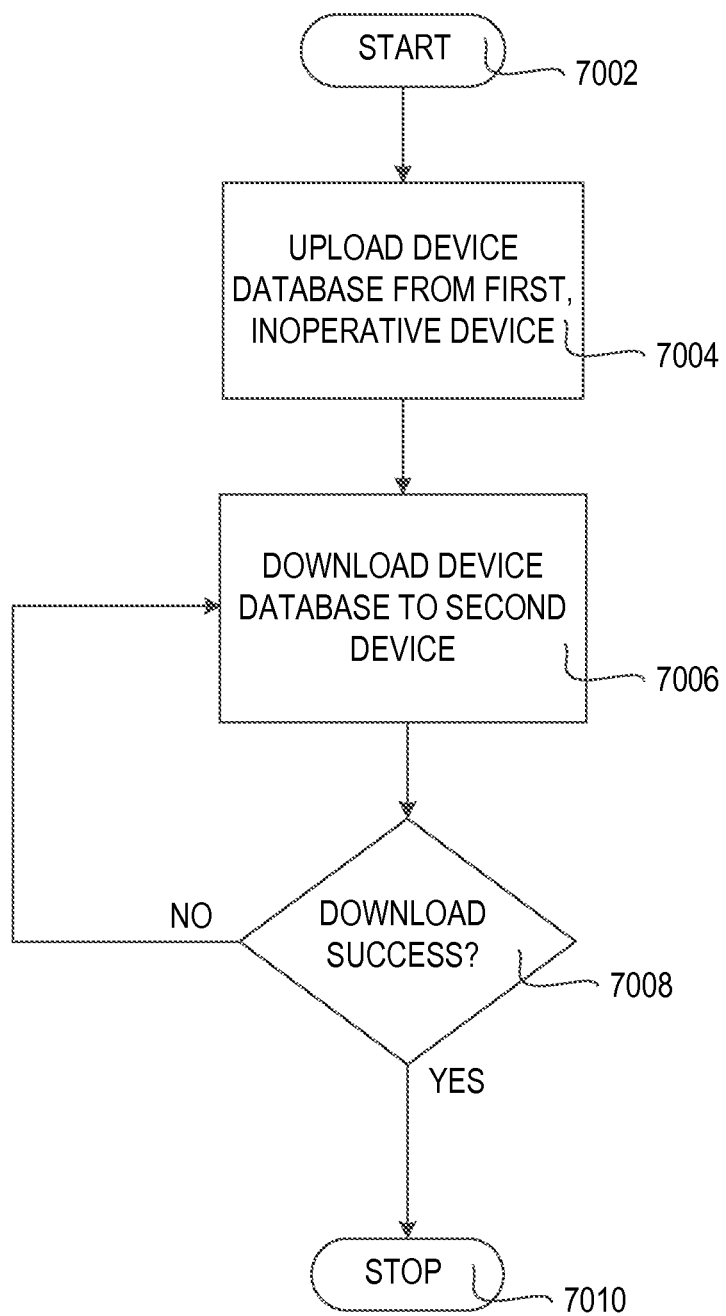
FIG. 7B is a flowchart of an example technique to transfer via near field communication (NFC) a database of an inoperative load control device to a replacement load control device.

FIG. 7B is a flowchart of an example technique to transfer via near field communication (NFC) a database of an inoperative load control device to a replacement load control device. At 7002, at a starting point, a first device (e.g. a load control device) may become inoperative for one or more configured operations. At 7004, the first device database may be uploaded via near field communication (e.g. to a wireless control device). At 7006, the device database may be downloaded to a second device via near field communication. The second device may be a load control device that may be operative for the one or more configured operations for which the first device was configured. At 7008, the download to the second device may be determined to be successful. At 7010, if a successful download is determined, the technique may end and the second device may operate in the place of the first device.

Figure 8:
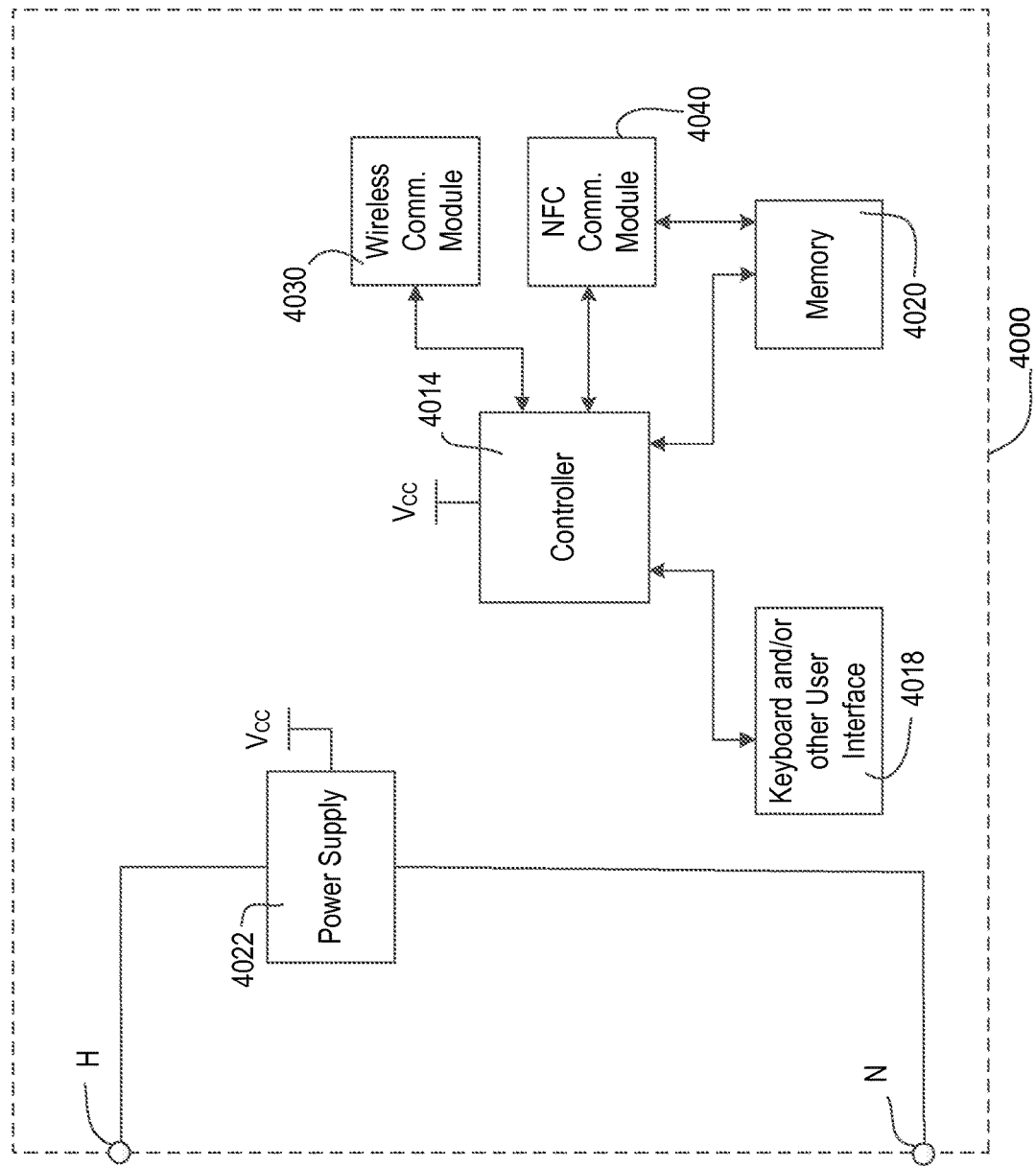
FIG. 8 is a simplified block diagram of an example wireless control device that may be capable of NFC communication and implementing one or more of the techniques described herein.

FIG. 8 is a simplified block diagram of representative wireless control device 4000 (e.g. a smart cellular phone) that may be configured to implement any of the techniques described herein. The wireless device may include a controller 4014. The controller 4014 may comprise a microcontroller, a programmable logic device (PLD), a processor, a microprocessor, an application specific integrated circuit (ASIC), a field-programmable gate array (FPGA), and/or any suitable processing device or control circuit. The controller 4014 may be configured to implement one or more of the contemplated techniques described herein (e.g., initiate NFC communication).

The controller 4014 may also be coupled to a memory 4020 that may be used for storage of, among other things, access information for a wireless communication network, such as the SSID, security type, and/or key. The memory 4020 may also store programming instructions for communicating via a wireless communication link, or the like. The memory 4020 may be implemented as an external integrated circuit (IC) or as an internal circuit of the controller 4014. The wireless device 4000 may further comprise a power supply 4022 that may generate a direct-current (DC) voltage $V_{CC}$ for powering the controller 4014, the memory 4020, a wireless communication module 4030, an NFC communication module 4040, a user interface input-output module 4018, and other elements of the wireless device shown and not shown. The power supply 4022 may be coupled to an alternating-current (AC) power source (not shown) via hot and neutral terminals H, N. Alternatively, the wireless device could comprise a battery for providing a battery voltage for powering the controller 4014, the memory 4020, a wireless communication module 4030, an NFC communication module 4040, a user interface input-output module 4018, and other elements of the wireless device.

The wireless device 4000 may further include the wireless communication module 4030 for transmitting and receiving radio frequency (RF) signals to and from the wireless device 4000. For example, the wireless communication module 4030 may be configured to communicate via a Wi-Fi communication link, a Wi-MAX communication link, a Clear Connect™ communication link, and/or a Bluetooth® communication link. When the wireless communication module 4030 comprises a Wi-Fi module, the controller 4014 may be operable to communicate via digital messages in Wi-Fi packets (e.g., Internet Protocol packets received via the Wi-Fi signals). The wireless communication module 4030 may include one or more RF transceivers and at least one antenna. The one or more RF transceivers may include one or more RF transmitters (e.g. transmitter circuits) and/or one or more RF receivers (e.g. receiver circuits). The controller 4014 may transmit messages from the wireless device 40000 via digital messages transmitted via the RF signals. For example, the controller 4014 may be used to transmit digital messages via wireless communication.

The wireless device 4000 may further include the NFC communication module 4040 for transmitting and receiving NFC protocol radio frequency (RF) signals to and from the wireless device 4000 and/or RFID devices, among other devices. For example, the NFC communication module 4040 may be configured to communicate via an NFC communication link. The NFC communication module 4040 may include one or more RF transceivers and at least one antenna. The one or more RF transceivers may include one or more RF transmitters (e.g. transmitter circuits) and/or one or more RF receivers (e.g. receiver circuits). The controller 4014 may transmit messages from the wireless device 4000 via the NFC protocol as transmitted via NFC/RF signals. For example, the controller 4014 may be used to transmit NFC messages via NFC-based wireless communication.

The wireless device 4000 may also include a user-interface input-output module 4018 for operating a character-based keyboard (hard-key or virtual) and/or another user/interface, such as a touch-screen interface. The controller 4014 may communicate with the user interface input-output module 4018 to receive user-input information (e.g. the access information for the wireless communication network). The controller 4014 may also communicate with the user-interface input-output module 4018 to allow the user to interact with and to control various functions that the controller may be configured to perform, such as but not limited to one or more of the contemplated techniques described herein to communicate information via NFC protocol communication.

Figure 9:
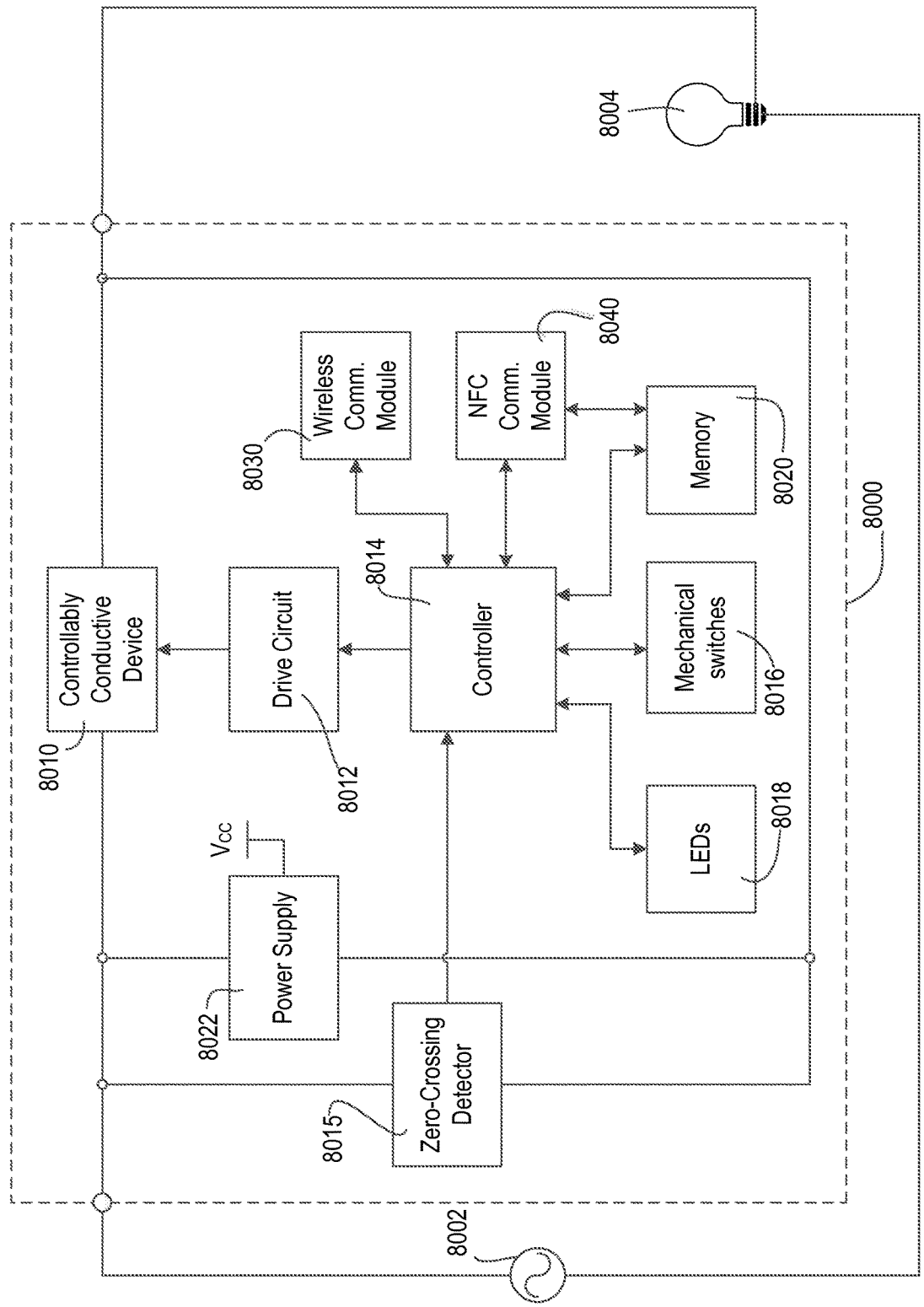
FIG. 9 is a simplified block diagram of a dimmer switch as an example load control device capable of NFC communication and implementing one or more of the techniques described herein.

FIG. 9 is a simplified block diagram of the dimmer switch 8000 (as an example load control device capable of NFC communication and to implement one or more of the techniques described herein). The dimmer switch 8000 may include a controllably conductive device 8010 coupled in series electrical connection between an AC power source 8002 and a lighting load 8004 for control of the power delivered to the lighting load. The controllably conductive device 8010 may comprise a relay or other switching device, or any suitable type of bidirectional semiconductor switch, such as, for example, a triac, a field-effect transistor (FET) in a rectifier bridge, or two FETs in anti-series connection. The controllably conductive device 8010 may include a control input coupled to a drive circuit 8012.

The dimmer switch 8000 may further include a controller 8014 coupled to the drive circuit 8012 for rendering the controllably conductive device 8010 conductive or non-conductive to thus control the power delivered to the lighting load 8004. The controller 8014 may include a microcontroller, a programmable logic device (PLD), a microprocessor, an application specific integrated circuit (ASIC), a field-programmable gate array (FPGA), or any suitable processing device or control circuit. A zero-crossing detector 8015 may determine the zero-crossings of the AC line voltage from the AC power supply 8002. A zero-crossing may be the time at which the AC supply voltage transitions from positive to negative polarity, or from negative to positive polarity, at the beginning of each half-cycle. The controller 8014 may receive the zero-crossing information from the zero-crossing detector 8015 and may provide the control inputs to the drive circuit 8012 that may render the controllably conductive device 8010 conductive and non-conductive at predetermined times relative to the zero-crossing points of the AC waveform.

The controller 8014 may receive inputs from mechanical switches 8016 that may be mounted on a printed circuit board (not shown) of the dimmer switch 8000, and may be arranged to be actuated by a toggle actuator (not shown) and an intensity adjustment actuator (not shown). The controller 8014 may also control light-emitting diodes 8018, which may also be mounted on the printed circuit board. The light emitting diodes 8018 may be arranged to illuminate the status indicators (not shown) on the front surface of the dimmer switch 8000, for example, through a light pipe structure (not shown). The controller 8014 may also be coupled to a memory 8020 for storage of unique identifiers (e.g., the MAC address and the IP address) of the dimmer switch 8000, the SSID, the security type, and/or the security key of the wireless communication network, instructions for controlling the lighting load 8004, programming instructions for communicating via a wireless communication link, or the like. The memory 8020 may be implemented as an external integrated circuit (IC) or as an internal circuit of the controller 8014. A power supply 8022 may generate a direct-current (DC) voltage $V_{CC}$ for powering the controller 8014, the memory 8020, and other low-voltage circuitry of the dimmer switch 8000.

The dimmer switch 8000 may further include a wireless communication module 8030 for transmitting and receiving the RF signals to and from the wireless device 4000 and/or a wireless router. For example, the wireless communication module 8030 may be configured to communicate via a Wi-Fi communication link, a Wi-MAX communication link, a Clear Connect™ communication link, and/or a Bluetooth® communication link. When the wireless communication module 8030 comprises a Wi-Fi module, the controller 8014 may be operable to control the lighting load 8004 in response to received digital messages in Wi-Fi packets (e.g., Internet Protocol packets received via the Wi-Fi signals). The wireless communication module 8030 may comprise an RF transceiver and an antenna. The one or more RF transceivers may include one or more RF transmitters (e.g. transmitter circuits) and/or one or more RF receivers (e.g. receiver circuits).

The dimmer switch 8000 may further include an NFC communication module 8040 for transmitting and receiving NFC protocol radio frequency (RF) signals to and from the dimmer switch 8000 and/or or RFID devices, among other devices. For example, the NFC communication module 8040 may be configured to communicate via an NFC communication link. The NFC communication module 8040 may include one or more RF transceivers and at least one antenna. The one or more RF transceivers may include one or more RF transmitters (e.g. transmitter circuits) and/or one or more RF receivers (e.g. receiver circuits). The controller 8014 may transmit messages from the dimmer switch 8000 via the NFC protocol as transmitted via NFC/RF signals. For example, the controller 8014 may be used to transmit NFC messages via NFC-based wireless communication.

Examples of antennas for wall-mounted dimmer switches are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The controller 8014 may also transmit and receive messages to the wireless device 4000 via digital messages and/or NFC signals transmitted via the NFC/RF signals. For example, the controller 8014 of the dimmer switch 8000 may be used to transmit digital messages to the wireless device 4000 via wireless communication. The digital messages may include alerts and/or feedback and status information regarding the lighting load 8004. The digital messages may also include error messages or indications as to whether the dimmer switch 8000 may be able to communicate via a wireless communication link or NFC/RF signal, for example.

Figure 1:
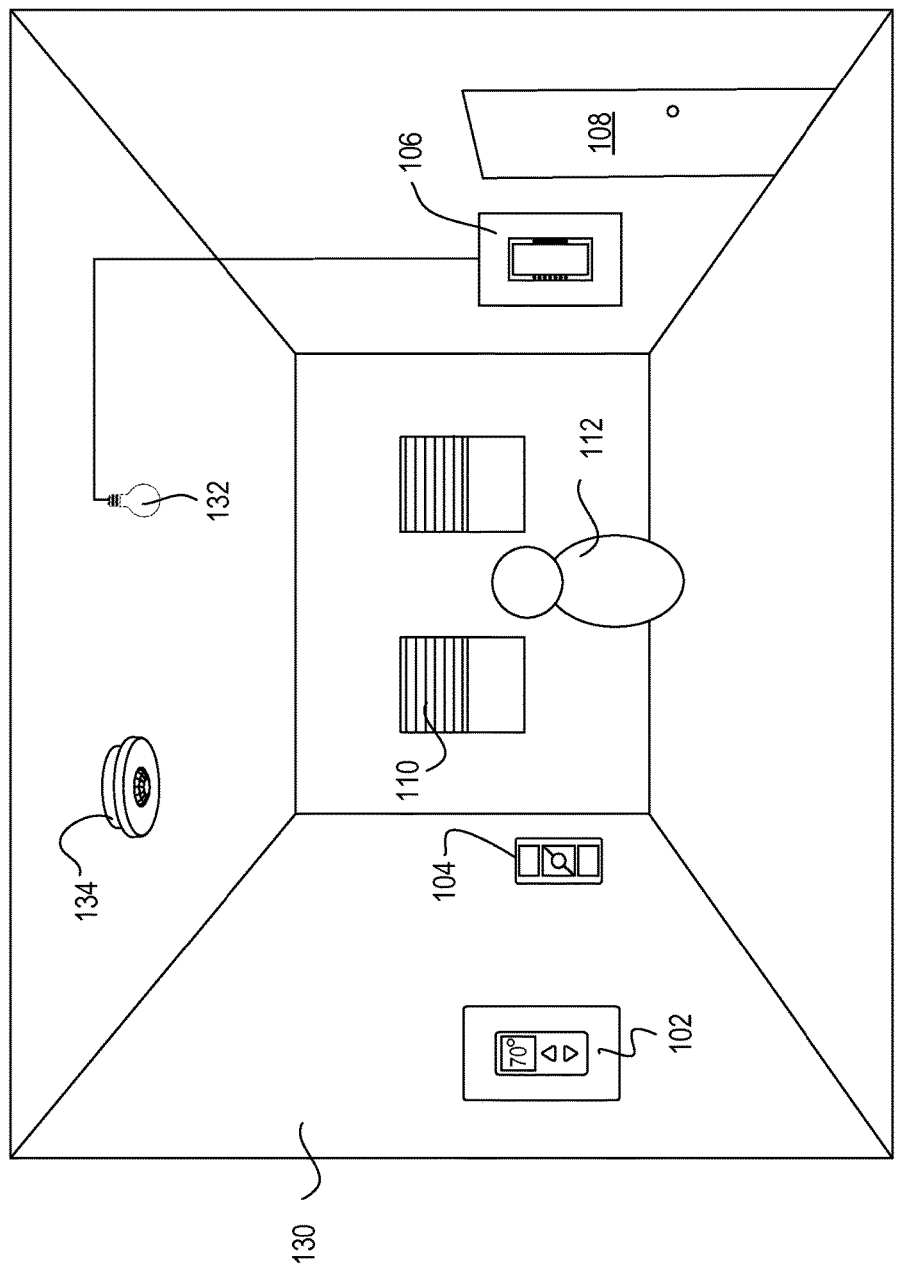
FIG. 1 depicts an example environment that includes an energy control system.
Figure 10:
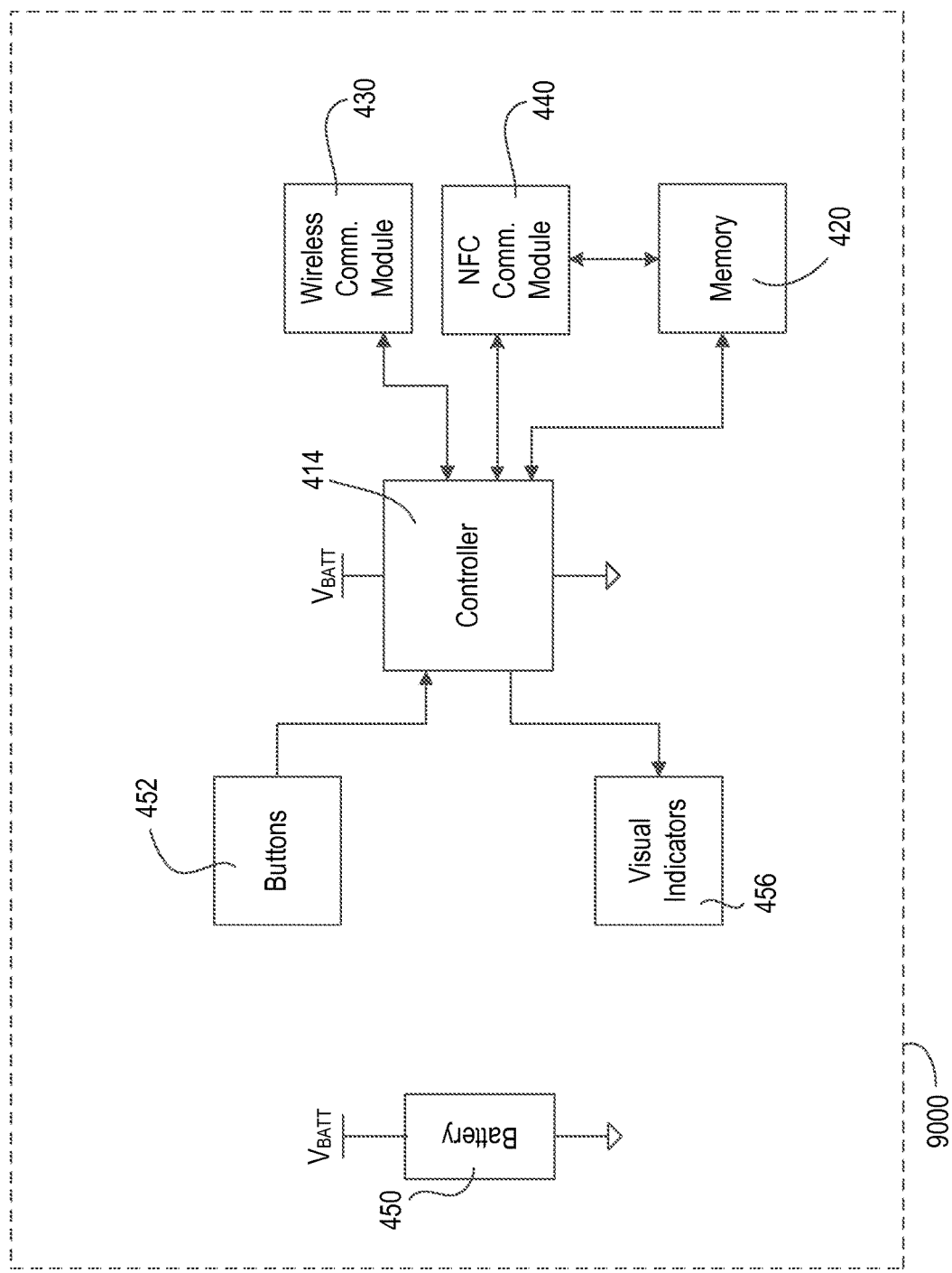
FIG. 10 a simplified block diagram of an example input device that may be capable of NFC communication and implementing one or more of the techniques described herein.

FIG. 10 a simplified example block diagram 9000 of an input device like the remote control device 104 of FIG. 1. The example remote control device 9000 may include devices such as a controller 414, a memory 420, a wireless communication module 430, and an NFC communication module 440. One or more of the elements within these devices, one or more of the functions of these devices, and/or one or more of the interactions of and among these devices may be the same or similar as described with respect to the dimmer switch 8000 of FIG. 9. The remote control device 9000 may also include a battery power supply 450 that may provide electrical power to the one or more devices included in the remote control device 9000, such as the controller 414.

The example remote control device 9000 may also include buttons 452, visual indicators 456, and/or a battery 450. The controller 414 of remote control device 9000 may be configured to receive commands input via the one or more buttons 452. The one or more buttons 452 may include one or more soft buttons or one or more hard buttons (e.g. physical buttons or manual operators). For example, the controller 414 may interpret inputs via the one or more buttons 452 as user commands intended for one or more devices (e.g. a dimmer switch). Again by way of example, a user may contact one button of the one or more buttons 452 of remote control device 9000 to order the appropriate dimmer switch (e.g. dimmer switch 8000) to adjust the intensity of a lighting load 8004 to 50%, among many other configurable adjustments. The controller 414 of remote control device 9000 may interpret the signal from the one button of the one or more buttons 452 as a command to order the dimmer switch 8000 to perform the adjustment to 50%.

The controller 414 may communicate the command to the dimmer switch 8000 via one or more wireless signals sent via wireless communication module 430 and/or 440 (e.g. in a manner that is the same or similar to the functions described with respect to communication modules 8030 and/or 8040 as described with regard to FIG. 9). The controller 414 of 5000 may be configured to control one or more visual indicators 456 to provide the user with one or more feedback or status indications (e.g. at least for a period of time). For example, one indicator of the one or more indicators 456 may indicate (e.g. for some period of time) that one or more buttons 452 may have been activated by a user (e.g. as interpreted by the controller 414). Also by way of example, one indicator of the one or more indicators 456 may indicate (e.g. for a period of time) that the dimmer switch 8000 has received the command from the controller 414 to perform an adjustment (e.g. as input by the user) of the lighting load 8004. Also by way of example, one indicator of the one or more indicators 456 may indicate that that battery 450 is at a low level of charge.

FIG. 11 is a simplified example block diagram 9050 of a device like the occupancy sensor 180 of FIG. 1. The occupancy sensor 9050 may include one or more of the same or similar devices as those included and described with respect to the remote controller 9000 of FIG. 10. The one or more of the elements within these devices, one or more of the functions of these devices, and/or one or more of the interactions of and among these devices may be the same or similar as described with respect to FIG. 10.

The occupancy sensor 9050 may also include at least one sensor circuit 454. The at least one sensor circuit 454 may detect the presence (or lack thereof) of people in a given area of senor effectiveness. The controller 414 of 9050 may be configured to receive a signal from the at least one sensor 454, interpret the signal as indicating a presence or absence of people in the given area of sensor effectiveness (perhaps for a period of time), and/or send one or more commands to other devices based on the interpreted presence of people or lack thereof. For example, should the controller 414 of 9050 interpret the at least one sensor 454 to report the lack of presence in the given area of effectiveness (perhaps for some period of time, e.g. 60 seconds), the controller may send respective commands to one or more of the dimmer switches (for example) to lower the respective intensities of the lighting loads connected to such dimmer switches (e.g. shutoff all the lights when all people have left the room). Also by way of example, should the controller 414 of 9050 interpret the at least one sensor 454 to report a transition from a lack of any presence to the presence of at least one person in the given area of effectiveness, the controller may send respective commands to one or more of dimmer switches to increase the respective intensities of the lighting loads connected to such dimmer switches (e.g. turn at least some of the lights when at least one person enters the area of sensor effectiveness). The controller 414 of 9050 may communicate the command to the dimmer switches via one or more wireless signals sent via wireless communication module 430 (e.g. in a manner that is the same or similar to the functions described with respect to communication modules 430 as described with regard to FIG. 10).

While the present application has been described with reference to the dimmer switches, RFID devices, occupancy sensors, remote control devices, and wireless control devices, the concepts of the contemplated devices and techniques could be applied to any control devices that are operable to communicate with each other, such as, for example, dimming ballasts for driving gas-discharge lamps; light-emitting diode (LED) drivers for driving LED light sources; screw-in luminaires including integral dimmer circuits and incandescent or halogen lamps; screw-in luminaires including integral ballast circuits and compact fluorescent lamps; screw-in luminaires including integral LED drivers and LED light sources; electronic switches, controllable circuit breakers, or other switching devices for turning appliances on and off; plug-in load control devices, controllable electrical receptacles, or controllable power strips for each controlling one or more plug-in loads; motor control units for controlling motor loads, such as ceiling fans or exhaust fans; drive units for controlling motorized window treatments or projection screens; motorized interior or exterior shutters; thermostats for a heating and/or cooling systems; temperature control devices for controlling setpoint temperatures of HVAC systems; air conditioners; compressors; electric baseboard heater controllers; controllable dampers; humidity control units; dehumidifiers; water heaters; pool pumps; televisions; computer monitors; audio systems or amplifiers; generators; electric chargers, such as electric vehicle chargers; an alternative energy controllers; occupancy sensors, vacancy sensors, daylight sensors, temperature sensors, humidity sensors, security sensors, proximity sensors, keypads, battery-powered remote controls, key fobs, cell phones, smart phones, tablets, personal digital assistants, personal computers, timeclocks, audio-visual controls, safety devices, and central control transmitters.

Additionally, the techniques described herein may be implemented as a set of computer-executable instructions stored on a computer-readable medium, such as a random-access or read-only memory for example. Such computer-executable instructions may be executed by a processor or microcontroller, such as a microprocessor, within the RFID devices, load control devise, or the wireless control devices, for example.

The invention claimed is:

1. A mobile device operable for wireless communication, the mobile device comprising:
a processor configured to:
transmit a serial number of the mobile device to a radio-frequency identification (RFID) device via a near-field communication (NFC) protocol, when the mobile device is proximate to the RFID device;
receive a load control command to change an amount of power delivered by a dimmer to an electrical load, wherein the load control command is received from the RFID device via the NFC protocol subsequent to transmission of the serial number; and
transmit the received load control command via a second wireless protocol to a wireless control device, wherein the wireless control device is further configured to transmit the load control command to the dimmer.

2. The mobile device of claim 1, wherein the second wireless protocol is a radio frequency protocol.

3. The mobile device of claim 1, wherein the mobile device is configured to transmit the received load control command to the wireless control device via a wireless router.

4. The mobile device of claim 2, wherein the second wireless protocol is a Wi-Fi protocol.

5. A method performed by a mobile device, the method comprising:
transmitting a serial number of the mobile device to a radio-frequency identification (RFID) device via a near-field communication (NFC) protocol, when the mobile device is proximate to the RFID device;
receiving a load control command to change an amount of power delivered by a dimmer to an electrical load, wherein the load control command is received from the RFID device via the NFC protocol subsequent to transmission of the serial number; and
transmitting the received load control command via a second wireless protocol to a wireless control device, wherein the wireless control device is further configured to transmit the load control command to the dimmer.

6. The method of claim 5, wherein the second wireless protocol is a radio frequency protocol.

7. The method of claim 5, wherein transmitting the received load control command to the wireless control device comprises transmitting the received load control command to the wireless control device via a wireless router.

8. The method of claim 6, wherein the second protocol comprises a Wi-Fi protocol.

9. A non-transient computer readable medium having stored thereon program instructions that when executed by a processor of a mobile device operable for wireless communication, cause the processor to:
transmit a serial number of the mobile device to a radio-frequency identification (RFID) device via a near-field communication (NFC) protocol, when the mobile device is proximate to the RFID device;
receive a load control command to change an amount of power delivered by a dimmer to an electrical load, wherein the load control command is received from the RFID device via the NFC protocol subsequent to transmission of the serial number; and
transmit the received load control command via a second wireless protocol to a wireless control device, wherein the wireless control device is further configured to transmit the load control command to the dimmer.

10. The non-transient computer readable medium of claim 9, wherein the second wireless protocol is a radio frequency protocol.

11. The non-transient computer readable medium of claim 9, wherein the program instructions are further configured to cause the processor to transmit the received load control command to the wireless control device via a wireless router.

12. The non-transient computer readable medium of claim 10, wherein the second wireless protocol is a Wi-Fi protocol.

* * * * *